US008230796B2

(12) United States Patent
Andrus, Jr. et al.

(10) Patent No.: US 8,230,796 B2
(45) Date of Patent: Jul. 31, 2012

(54) AIR-FIRED $CO_2$ CAPTURE READY CIRCULATING FLUIDIZED BED STEAM GENERATORS

(76) Inventors: Herbert E. Andrus, Jr., Granby, CT (US); Gregory N. Liljedahl, Tariffville, CT (US); John L Marion, West Simsbury, CT (US); Nsakala Ya Nsakala, South Windsor, CT (US)

( * ) Notice: Subject to any disclaimer, the term of this patent is extended or adjusted under 35 U.S.C. 154(b) by 805 days.

(21) Appl. No.: 12/392,355

(22) Filed: Feb. 25, 2009

(65) Prior Publication Data

US 2009/0211503 A1     Aug. 27, 2009

Related U.S. Application Data

(60) Provisional application No. 61/031,764, filed on Feb. 27, 2008, provisional application No. 61/031,761, filed on Feb. 27, 2008.

(51) Int. Cl.
*F23G 5/30* (2006.01)
*F23L 7/00* (2006.01)
*F23L 15/00* (2006.01)

(52) U.S. Cl. ......... 110/245; 110/302; 110/347; 110/348

(58) Field of Classification Search ................ 110/245, 110/302, 347; 122/4 D
See application file for complete search history.

(56) References Cited

U.S. PATENT DOCUMENTS

| | | | |
|---|---|---|---|
| 5,784,975 A | * | 7/1998 | Tanca ............................ 110/245 |
| 6,202,574 B1 | | 3/2001 | Liljedahl et al. | 
| 6,505,567 B1 | * | 1/2003 | Anderson et al. .............. 110/344 |
| 6,601,541 B2 | * | 8/2003 | Burdis et al. .................. 110/245 |

(Continued)

FOREIGN PATENT DOCUMENTS

EP     0220342 A1     5/1987

(Continued)

OTHER PUBLICATIONS

PCT International Search Report and The Written Opinion of the International Searching Authority dated Nov. 3, 2010—(PCT/US2009/035208).

*Primary Examiner* — Kenneth Rinehart
*Assistant Examiner* — David J Laux
(74) *Attorney, Agent, or Firm* — Lawrence P. Zale

(57) ABSTRACT

A combustor 110 is operative to effect therewith the combustion of fossil fuel 114' in order to thereby both heat to a working fluid 102 and generate a flue gas 104. An air preheater 144 receives the flue gas 104 generated in the combustor 110. A blower 180 causes air 188 to flow to the air preheater 144 when operating in an air fired mode, and causes both $O_2$ and recycled flue gas 188' to flow when operating in the $O_2$ firing mode. The air preheater 144 is operative to transfer heat from the flue gas 150 received thereby to the air 188 that is received when operating in an air fired mode or to both the received $O_2$ and the recycled flue gas 188' that is received when operating in the $O_2$ firing mode in order to thereby effect a preheating of the air 188 or of both the $O_2$ and recycled flue gas, 188' depending upon the specific nature of the mode of operation thereof, and to thereby effect therewith a cooling of the flue gas received thereby. The preheated air 142 or both the preheated $O_2$ and the recycled flue gas 142', depending upon the specific nature of the mode of operation, is caused to flow from the air preheater 144 to the combustor 110 in order to thereby effect therewith a fluidization of the fossil fuel 114'.

12 Claims, 2 Drawing Sheets

U.S. PATENT DOCUMENTS 7,861,526 B2 * 1/2011 Gericke ............... 60/653
2008/0286707 A1 * 11/2008 Panesar et al. ........... 431/10

FOREIGN PATENT DOCUMENTS

| | | |
|---|---|---|
| EP | 1772670 A1 | 4/2007 |
| FR | 2866695 | 8/2005 |
| FR | 2870925 | 12/2005 |
| WO | WO 01/84051 A1 | 11/2001 |
| WO | WO 2004/042276 A2 | 5/2004 |

* cited by examiner

AIR-FIRED CO₂ CAPTURE READY CIRCULATING FLUIDIZED BED STEAM GENERATORS

CROSS-REFERENCE TO RELATED APPLICATION

The present invention claims the benefit of co-pending U.S. Provisional Patent Application Ser. No. 61/031,764, entitled "AIR-FIRED $CO_2$ CAPTURE READY CIRCULATING FLUIDIZED BED HEAT GENERATION", and co-pending U.S. Provisional Patent Application Ser. No. 61/031,761, entitled "AIR-FIRED $CO_2$ CAPTURE READY CIRCULATING FLUIDIZED BED HEAT GENERATION WITH A REACTOR SUBSYSTEM", both of which are incorporated herein by reference in their entirety.

FIELD OF THE INVENTION

The present invention relates generally to steam generation, and more particularly, to air-fired fluidized bed steam generators that are $CO_2$ capture ready in that such fluidized bed steam generators are retrofitable for oxygen firing.

BACKGROUND OF THE INVENTION

Heat generating systems embodying furnaces for combusting fossil fuels have long been utilized to generate controlled heat, with the objective of doing useful work. The work might be in the form of direct work, as with kilns, or might be in the form of indirect work, as with steam generators for industrial or marine applications or for driving turbines that produce electric power. Modern water-tube furnaces for steam generation can be of various types, including but not limited to, fluidized-bed boilers. While there are various types of fluidized-bed boilers, generally speaking, all operate on essentially the same principle wherein a gas, commonly in the form of air, is injected to fluidize solids prior to the combustion of fuel within the fluidized-bed boiler.

In accordance with the mode of operation of circulating fluidized-bed (CFB) type boilers typically a gas, e.g., by way of exemplification, air, is made to flow through a bed of solid particles in order to thereby produce forces that are capable of effecting therewith a separation of the solid particles from one another. To this end, as the flow of gas is increased, a point is thus reached at which the forces produced by such gas, which are applied to the solid particles, are just sufficient enough to cause separation of the solid particles from one another. When this point is reached, the bed of the CFB boiler becomes fluidized such that the cushion of gas that is present between the solid particles allows the solid particles to move freely, thereby giving the bed of solid particles of the CFB boiler the characteristics of a liquid. The bulk density of the bed of solid particles of the CFB boiler is relatively high at the point in time when the solid particles that comprise the bed of the CFB boiler become fluidized, but the bulk density thereof will decrease as the bed of solid particles is made to flow upward through the CFB boiler where the solid particles are combusted to generate heat.

The solid particles, which are made to circulate within the CFB boiler, typically include solid fuel particles, such as crushed or pulverized coal or other solid fuel, and sorbent particles, such as crushed or pulverized limestone, dolomite or other alkaline earth material. Combustion of the solid fuel particles within the CFB boiler results in the production of flue gas and ash. During such combustion of the solid fuel particles, the carbon in the solid fuel particles becomes oxidized thereby resulting in the generation of carbon dioxide ($CO_2$). Nitrogen is also oxidized during such combustion of the solid fuel particles thereby resulting in the generation of nitrogen oxide ($NO_x$). Additionally, during such combustion of the solid fuel particles sulfur is oxidized to form sodium dioxide ($SO_2$). Such $CO_2$, $NO_x$, $SO_2$ as well as the other gases that are generated during the combustion of the solid fuel particles within the CFB boiler collectively together comprise what is commonly referred to as the flue gas. The ash produced during the combustion of the solid fuel particles within the CFB boiler, generally speaking, consists primarily of unburned solids in the form of inert material and sorbent particles. Such ash, or at least some portion thereof, is sometimes also referred to as particulate matter. The ash, which is produced from the combustion of the solid fuel particles within the CFB boiler, becomes entrained in and is carried in an upwardly flow path within the CFB boiler by the hot flue gas that is produced during such combustion of the solid fuel particles. This ash thereafter is exhausted from the CFB boiler along with the hot flue gas. During this upwardly flow of the hot flue gas within the CFB boiler, the $SO_2$ in this hot flue gas is designed to be absorbed by the particles of sorbent to which reference has been made hereinbefore.

In accordance with the present invention an air pollution control (APC) subsystem of conventional construction is preferably employed to remove various so-called pollutants, including, by way of exemplification, $CO_2$, $NO_x$, $SO_2$ and particulate matter, from the flue gas that is generated from the aforementioned types of heat generating systems. To this end, such flue gas that is exhausted from the CFB boiler is directed to the various components of an APC subsystem of conventional construction before reaching the stack and before being exhausted from the stack into the atmosphere. Each of the components of such an APC subsystem can be considered to be a system in such a component's own right. For instance, by way of exemplification and not limitation in this regard, such flue gas may be subjected to being processed through the use of a cyclone separator and/or an electrostatic precipitator in order to thereby remove the particulate matter from such flue gas, viand may be subjected to being processed through the use of a selective catalytic reduction (SCR) system in order to thereby remove the $NO_x$ from such flue gas, and may be subjected to being processed through the use of a $SO_2$ scrubber system in order to thereby remove the $SO_2$ from such flue gas, and may be subjected to being processed through the use of a $CO_2$ scrubber system in order to thereby remove the $CO_2$ from such flue gas.

However, there are other ways that are also known to be operative for purposes of effecting therewith the reduction of emissions from a flue gas. For example, it is known in this regard that $CO_2$ and $NO_x$ emissions can be reduced by employing oxygen in the combustion process. More specifically, to this end in U.S. Pat. No. 6,505,567, which was issued on Jan. 14, 2003 that is entitled "Oxygen Fired Circulating Fluidized Bed Steam Generator", and which is assigned to the same assignee as that to which the present application is assigned, there is described and illustrated a CFB boiler steam generating system that employs oxygen, rather than air, to effect therewith the fluidization of the fuel in the CFB boiler. The CFB boiler steam generating system that is described and illustrated in U.S. Pat. No. 6,505,567 facilitates the use of $CO_2$ both as a desired end product and as a means of support for the combustion process. By virtue of this reference thereto the disclosure of U.S. Pat. No. 6,505,567 is hereby incorporated herein in its entirety.

In accordance with the technique that is described and illustrated in U.S. Pat. No. 6,505,567, a substantially pure oxygen feed stream is introduced into the CFB boiler of the steam generating system. Fuel is then combusted in the presence of this substantially pure oxygen feed stream as well as in the presence of a recirculated flue gas stream in order to thereby produce a flue gas in which $CO_2$ and water vapor are the flue gas' two largest constituent elements by volume, and a flue gas, which is substantially free of $NO_x$. Such flue gas is designed to be made to flow through an oxygen feed stream pre-heater, the latter being operative to transfer heat from such flue gas to the oxygen feed stream. With further reference thereto, such flue gas is then separated into an end product portion and a recycling portion. Such end product portion of the flue gas is thereafter subjected to being cooled and compressed in order to thereby yield $CO_2$ in a liquid phase. On the other hand, the recycling portion of the flue gas is thereafter directed back to the CFB boiler of the steam generating system for purposes of thereby contributing to the combustion process therein.

The technique that is disclosed and illustrated in U.S. Pat. No. 6,505,567 provides one with the flexibility to be able to use as a desirable end product the $CO_2$ that is produced therefrom as well as to be able to support the combustion process therewith. The production of liquid $CO_2$ also functions to improve the heat output of the CFB boiler steam generating system. However, while the technique that is disclosed and illustrated in U.S. Pat. No. 6,505,567 can be used for purposes of significantly reducing the amount of $CO_2$ emissions, there nevertheless remains a reluctance by some in many quarters to provide additional coal fired steam generating system capacity because of their concerns that there may be enacted future governmental regulations regarding $CO_2$ emissions and the costs that may be required to be incurred in order to thereby meet such regulations. In this regard, studies have shown, by way of exemplification, that the investment required in terms of the costs to retrofit conventionally constructed coal fired CFB boiler steam generating systems for $CO_2$ capture typically would be in the range of $1000 to $1600 per kilowatt (kW). Such studies have also shown that the energy penalty for effecting such $CO_2$ capture in the case of coal fired CFB boiler steam generating systems typically would range from 25% to 40%. With further reference thereto, particularly in the case of retrofit situations, the site itself of such coal fired CFB boiler steam generating systems may be insufficient to accommodate a CFB boiler steam generating system of the type that is described and illustrated in U.S. Pat. No. 6,505,567.

Thus, while it is recognized that a need exists for providing more steam generating system capacity in order to thereby produce, for example, additional electrical power, it is also recognized that coal fired CFB boiler steam generating systems are an efficient means for effecting therewith the generation of such steam. Nevertheless, in view of the ongoing debate over global warming, as well as in view of the increasing attention being directed to $CO_2$ emissions from the burning of fossil fuels such as coal, the cost in particular of capturing $CO_2$ in terms of both the capital expense required therefor and the reduced energy production provided thereby, undoubtedly have resulted in the delaying of at least some installations, which could otherwise have provided the increase in capacity that is required, and thereby thus increase the availability of power that both the nation and the world require.

Accordingly, a need has been found to exist in the prior art for a new and improved technique operative for purposes of effecting therewith the capture of the $CO_2$ that is generated by fossil fuel fired steam or other heat generating systems during the operation thereof.

OBJECTS OF THE INVENTION

Accordingly, it is an objective of the present invention to provide a technique for capturing $CO_2$, which is generated during the operation of fossil fuel fired steam or other heat generating systems, and which can be implemented at less expense and/or with greater efficiency than the techniques that are presently known.

Additional objects, advantages, and novel features of the present invention will become apparent to those skilled in the art from this disclosure, including the following detailed description when considered with the illustrations thereof that are to be found set forth in the drawings hereof, as well as by practice of the present invention. While the present invention is described and illustrated hereinafter with reference to a preferred embodiment(s), it will be readily understood by those skilled in this art that the present invention is not limited thereto. To this end, those of ordinary skill in the art having access to the teachings of the present invention that are set forth herein will recognize that there are additional implementations, modifications, and embodiments, as well as other fields of use, which without departing from the essence of the present invention fall within the scope of the present invention as disclosed, illustrated and claimed herein and with respect to which the present invention could be of significant use.

SUMMARY OF THE INVENTION

In accordance with the present invention, heat can be generated in a steam generating system that is being operated in either an air fired mode or an oxygen fired mode. To do so, fossil fuel, such as coal or another fossil fuel, is preferably first fluidized to thereby create a fluidized bed. This fluidized bed in turn may be in the form of a circulating fluidized bed (CFB), although this is not required. Combustion of the aforementioned fossil fuel is operative to heat a working fluid and to generate a flue gas therefrom as well. This working fluid sometimes will be referred to as the first working fluid, and without departing from the essence of the present invention could be in the form of water, steam, a mixture of water and steam, or some other type of working fluid. If such combustion of the fossil fuel is performed while the steam generating system is being operated in an air fired mode, heat from the flue gas that is generated from such combustion is preferably transferred to the air to thereby preheat such air and to concomitantly effect a cooling of the flue gas that is generated during such combustion of the fossil fuel. The fossil fuel is then caused to be fluidized by means of the preheated air. On the other hand, if such combustion of the fossil fuel is performed while the steam generating system is being operated in an oxygen fired mode, heat from the flue gas that is generated from such combustion is preferably transferred to the oxygen and to the recycled flue gas to thereby preheat such oxygen and such recycled flue gas and to concomitantly effect a cooling of the flue gas that is generated during such combustion of the fossil fuel. The fossil fuel is then caused to be fluidized by means of the preheated oxygen and of the recycled flue gas.

Typically, such combustion of the fossil fuel will also result in the generation of residual hot solids, which become entrained in the flue gas that is generated during such combustion of the fossil fuel. Continuing, in such a case, the aforementioned entrained hot solids are subjected to being separated from the flue gas, and when so separated from the flue gas it is this separated flue gas that effects the transfer of heat therefrom either to the air or to both the oxygen and recycled flue gas as has been described hereinbefore.

Moreover, heat is preferably transferred from the separated hot solids to another, i.e., a second, working fluid, in order to thereby effect a cooling of the hot solids that are received by the another, i.e., second, working fluid. This other, i.e., second, working fluid could also without departing from the essence of the present invention be in the form of water, steam, a mixture of water and steam, or some other type of working fluid. If such combustion of the fossil fuel is performed while the steam generating system is being operated in an air fired mode, the hot solids that are being subjected to cooling are caused to be fluidized with air. However, if such combustion of the fossil fuel is performed while the steam generating system is being operated in an oxygen fired mode, the hot solids that are being subjected to cooling are caused to be fluidized with either recycled flue gas or $N_2$. These previously hot solids that are now in the form of fluidized cooled solids are then advantageously subjected to combustion in order to thereby effect therewith a heating of the first working fluid as well as the generation of the flue gas.

Preferably if, but only if, such combustion of the fossil fuel is performed while the steam generating system is being operated in an oxygen fired mode, heat from the previously hot and now cooled flue gas, i.e., the flue gas that has been subjected to cooling by the transfer of heat therefrom to both the oxygen and recycled flue gas as has been described hereinbefore, is then transferred to another working fluid, which without departing from the essence of the present invention could be either a second or a third working fluid depending on the nature of the particular application in which the present invention is being employed, in order to thereby effect a heating of this latter working fluid and concomitantly therewith effect a further cooling of the cooled flue gas that has already been subjected to some cooling. This latter working fluid could also without departing from the essence of the present invention be in the form of water, steam, a mixture of water and steam, or some other type of working fluid. This latter heated working fluid as well as the previously mentioned heated first working fluid are each suitable for purposes of being employed to drive a turbine.

According to another aspect of the present invention, if, but only if, such combustion of the fossil fuel is performed while the steam generating system is being operated in an oxygen fired mode and the hot solids have been separated from the flue gas that is generated from the combustion of the fossil fuel, heat preferably is then transferred from the hot solids that have been separated from the flue gas to another working fluid, which without departing from the essence of the present invention could be either a second, or a third or a fourth working fluid depending on the nature of the particular application in which the present invention is being employed, in order to thereby effect a cooling therewith of the hot solids that have been separated from the flue gas and concomitantly therewith a heating of the latter working fluid. Preferably, the hot solids that are being subjected to cooling are fluidized with recycled flue gas, and such fluidized cooled solids are then subjected to combustion in order to thereby effect therewith a heating of the first working fluid and the flue gas that is generated from such combustion. In this case also, the latter working fluid without departing from the essence of the present invention could be in the form of water, steam, a mixture of water and steam, or some other type of working fluid. This latter heated working fluid as well as one or both of the other two heated working fluids to which reference has been had hereinbefore, are all suitable for purposes of being employed to drive the turbine.

In accordance with an application thereof by way of exemplification, a steam generating system constructed in accordance with the present invention includes a fossil fuel fired circulating fluidized bed (CFB) boiler, an air preheater, and a blower, the latter sometimes being referred to herein as a first blower. To this end, such a fossil fuel fired circulating fluidized bed (CFB) boiler is suitably configured, i.e., is suitably sized, suitably shaped and/or incorporates the necessary components, both to effect fluidization of such fossil fuel in order to thereby create therewith a fluidized bed, and to effect the combustion of such fossil fuel in order to effect a heating of a first working fluid and concomitantly therewith the generation of a flue gas. Continuing, such a fossil fuel fired circulating fluidized bed (CFB) boiler is also suitably configured so as to be capable of effecting therewith the exhaust of a flow of the heated first working fluid as well as a flow of the flue gas. With further regard to the aforedescribed exemplary application, the air preheater thereof preferably is configured so as to capable of receiving the flue gas that is exhausted from the fossil fuel fired circulating fluidized bed (CFB) boiler.

When the steam generating system to which reference is made in the preceding paragraph is being operated in an air fired mode, the blower thereof is suitably configured so as to be operative to cause air to be forced to the air preheater. The air preheater in turn is then operative to cause heat from the flue gas that is received by the air preheater to be transferred to the air, which flows through the air preheater, in order to thereby effect a preheating of such air. The air that is so preheated in the air preheater is then made to flow from the air preheater to the fossil fuel fired circulating fluidized bed (CFB) boiler and is employed in the latter for purposes of effecting therewith a fluidization of the fossil fuel. On the other hand, when the steam generating system to which reference is made in the preceding paragraph is being operated in an oxygen fired mode, the blower thereof is suitably configured so as to be operative to cause both oxygen and recycled flue gas to be forced to flow to the air preheater. The air preheater in turn is then operative to cause heat from the flue gas that is received by the air preheater to be transferred to such oxygen and recycled flue gas, in order to thereby effect therewith a preheating of such oxygen and recycled flue gas and concomitantly therewith a cooling of the flue gas that is received by the air preheater. The oxygen and recycled flue gas that is so preheated in the air preheater is then made to flow from the air preheater to the fossil fuel fired circulating fluidized bed (CFB) boiler and is employed in the latter for purposes of effecting a fluidization of the fossil fuel.

Typically, the combustion of the fossil fuel in the fossil fuel fired circulating fluidized bed (CFB) boiler also operates to generate residual hot solids, which become entrained in the hot flue gas that is exhausted from the fossil fuel fired circulating fluidized bed (CFB) boiler. If this is the case, the steam generating system constructed in accordance with the present invention preferably also includes a separator, and a heat exchanger, and another, i.e., a second, blower. Continuing, such a separator is designed to be configured so as to be operative to effect therewith a separation of such hot solids that are entrained in the hot flue gas from the hot flue gas that is exhausted from the fossil fuel fired circulating fluidized bed (CFB) boiler. It is this flue gas from which the hot solids have been separated that is received by the air preheater as has been described hereinabove. Continuing, the heat exchanger to which reference is made above, which sometimes will be referred to herein as a first heat exchanger, is designed so as to be suitably configured in order to be operative to receive the hot solids, which have been separated from the flue gas, and to transfer heat from the hot solids that have been received thereby to another, i.e., a second, working fluid, in order to thereby effect a cooling of the hot solids that are received thereby. This latter other working fluid without departing from the essence of the present invention could be water, steam, a mixture of water and steam, or some other type of working fluid. When the steam generating system constructed in accordance with the present invention is being operated in an air fired mode, the aforementioned second blower is suitably configured so as to be operative to cause air to be forced to flow to the aforementioned first heat exchanger. The air this is forced to so flow to the aforementioned first heat exchanger is operative both to fluidize and to cause the hot solids, which have been subjected to cooling, to be forced to flow from the aforementioned first heat exchanger to the fossil fuel fired circulating fluidized bed (CFB) boiler. On the other hand, when the steam generating system constructed in accordance with the present invention is being operated in an oxygen fired mode, the aforementioned second blower is suitably configured so as to be operative to cause recycled flue gas to be forced to flow to the aforementioned first heat exchanger. Such recycled flue gas that is forced to flow to the aforementioned first heat exchanger is operative both to fluidize and to cause the hot solids, which have been subjected to cooling, to be forced to flow from the aforementioned first heat exchanger to the fossil fuel fired circulating fluidize bed (CFB) boiler.

According to yet other aspects of the steam generating system constructed in accordance with the present invention, when the steam generating system of the present invention is being operated in an oxygen fired mode, the flue gas, after being subjected to cooling, may be caused to flow from the air preheater, to which reference has been had hereinbefore, to a working fluid heater. In such an event, such a working fluid heater would be suitably configured so as to be operative to receive the flue gas that is caused to flow after the cooling thereof from the aforementioned air preheater as well as from another working fluid, wherein the latter is either a second or a third working fluid depending upon the nature of the particular application in which the present invention is being employed. In this case also, the latter working fluid could be without departing from the essence of the present invention water, steam, a mixture of water and steam, or some other type of working fluid. However, preferably, this latter working fluid will be of the same type as the first working fluid. Continuing, the working fluid heater preferably also is suitably configured so as to be operative to effect a transfer of heat from the flue gas that is received thereby to the working fluid that is received thereby, such as to thereby effect a heating thereby of the working fluid that is received thereby as well as a further cooling of the flue gas that is received thereby. Such a working fluid heater in addition is also suitably configured so as to be operative to effect therewith the exhaust of a flow of the working fluid that has been so heated. Thus, a turbine, e.g., a steam turbine, is then capable of being driven by the flow of the heated working that is exhausted from such a working fluid heater as well as by the flow of the heated first working fluid that is exhausted from the fossil fuel fired circulating fluidized bed (CFB) boiler.

According to still other optional aspects thereof, the steam generating system constructed in accordance with the present invention may also include another, i.e., a second, heat exchanger that, when the steam generating system of the present invention is being operated in an oxygen fired mode, is suitably configured so as to be operative to receive the hot solids that have been separated from the flue gas and to transfer heat from the hot solids that have been received thereby to another working fluid, which in turn may comprise a second, a third or even a fourth working fluid depending on the nature of the particular application in which the present invention is being employed, in order to thereby effect a cooling of the hot solids received thereby and to effect a heating of such working fluid. In this case also, this latter working fluid could be without departing from the essence of the present invention water, steam, a mixture of water and steam, or some other type of working fluid, but preferably this latter working fluid will be of the same type as the first working fluid. Another blower, which without departing from the essence of the present invention could be the second blower that has been described hereinabove, is designed to be configured so as to be operative to cause the recycled flue gas to be forced to flow to the second heat exchanger. Such recycled flue gas that is forced to flow to the aforementioned second heat exchanger is operative both to fluidize and to cause the hot solids, which have been subjected to cooling, to be forced to flow from the aforementioned second heat exchanger to the fossil fuel fired circulating fluidized bed (CFB) boiler. Continuing, the heated working fluid that is exhausted from the aforementioned second heat exchanger is also capable of being used with one or both of the heated working fluids from the fossil fuel fired circulating fluidized bed (CFB) boiler and from the aforementioned working fluid heater in order to thereby drive the turbine therewith.

ENABLING DESCRIPTION OF A PREFERRED EMBODIMENT(S)

First Embodiment

Dual Mode System Components and Operations

Figure 1:
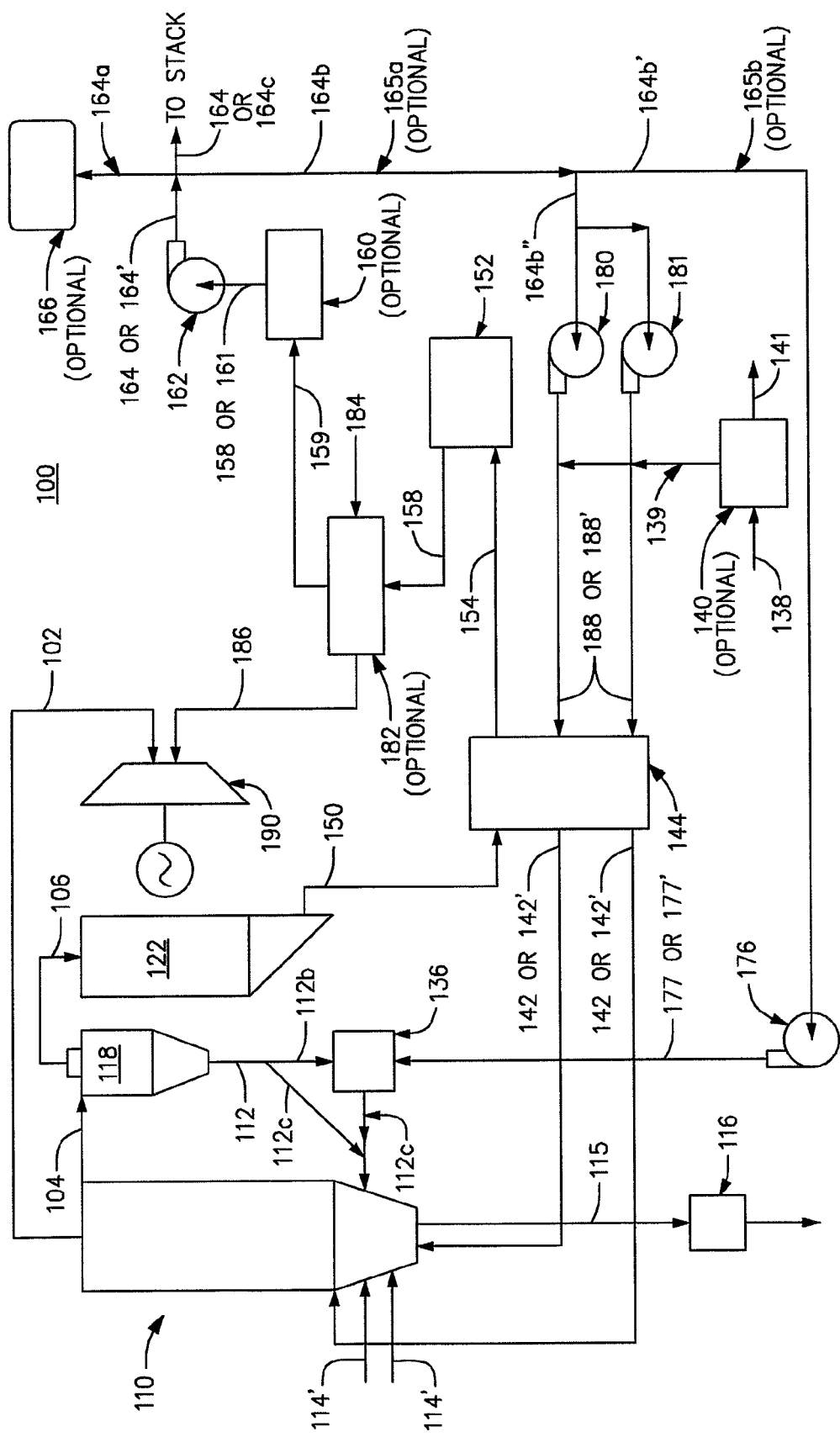
FIG. 1 is a schematic illustration of an air or oxygen fired steam generating system that includes a circulating fluidized bed (CFB) boiler, which is capable of being employed for purposes of effecting therewith the capture of a carbon dioxide ($CO_2$) end product when being operated in an oxygen firing mode, constructed in accordance with a first embodiment of the present invention.

In FIG. 1 there is depicted by way of exemplification a schematic illustration of an exemplary air or oxygen ($O_2$) fired circulating fluidized bed (CFB) steam generating system 100, constructed in accordance with a first embodiment of the present invention. The circulating fluidized bed (CFB) steam generating system 100, employs air, or when equipped with certain optional components is capable of being operated such as to employ $O_2$ in lieu of air, in order to thereby effect therewith the combustion of fossil fuel.

In accordance with the mode of operation thereof that is described hereinbelow, the fossil fuel that is combusted in the circulating fluidized bed (CFB) steam generating system 100 preferably is crushed coal. It should be understood that other types of fossil fuels could equally well be utilized in lieu of crushed coal without departing from the essence of the present invention. However, in any event preferably a fossil fuel with a high carbon content such as, by way of exemplification and not limitation, crushed coal or petcoke, or a biomass is employed. Continuing with the description of the circulating fluidized bed (CFB) steam generating system 100 that is illustrated in FIG. 1, the working fluid that is employed therein preferably is $H_2O$, which may be in a liquid form, or a gaseous form or a mixed liquid and gaseous state at different points in the course of the operation of the circulating fluidized bed (CFB) steam generating system 100. However, here again it should be understood that without departing from the essence of the present invention other types of working fluids could equally well be utilized in lieu of $H_2O$. Moreover, it will be understood that without departing from the essence of the present invention the working fluids, which flow within the various components of the circulating fluidized bed (CFB) steam generating system 100 may be of different types.

When being employed in an air fired mode, the circulating fluidized bed (CFB) steam generating system 100 is capable of being operated as a single cycle power generating system, in order to thereby generate electrical power therewith. However, when being employed in an $O_2$ firing mode, the circulating fluidized bed (CFB) steam generating system 100 is capable of being operated as a combined cycle power generating system, so as both to generate electrical power and to produce a carbon dioxide ($CO_2$) end product therewith. When being employed in an $O_2$ fired mode, the circulating fluidized bed (CFB) steam generating system 100 also optionally is capable of being operated in such a manner as to be able to produce a nitrogen (N2) end product therewith.

The circulating fluidized bed (CFB) steam generating system 100 is particularly advantageously characterized insofar as minimizing the pre-investment cost is concerned for purposes of enabling $O_2$ to be employed in lieu of air in order to thereby create the fluidization of the fossil fuel, and to effect the combustion of the fossil fuel, and in addition to effect also the capture of $CO_2$ as an end product. Operating the circulating fluidized bed (CFB) steam generating system 100 in an $O_2$ firing mode will result in an energy penalty insofar as the capture of $CO_2$ is concerned, such a penalty will fall on the lower end of the penalty range of 25% to 40% that is normally associated with effecting the capture of $CO_2$. To this end, after being equipped so as to be capable of $O_2$ firing, approximately a 25% reduction in net electrical output can be anticipated.

The circulating fluidized bed (CFB) steam generating system 100 constructed in accordance with the present invention embodies an air or $O_2$ fired circulating fluidized bed (CFB) boiler 110, which is designed to function as both a fluidization of fuel and a combustion of fuel vessel, or what is sometimes referred to as a combustor. The steam generating system 100 constructed in accordance with the present invention also includes a number of downstream flue gas treatment components, some of which are commonly considered to comprise part of an air pollution control (APC) subsystem.

Fluidizing and Combusting Fuel to Heat Working Fluid that Drives a Turbine

The circulating fluidized bed (CFB) boiler 110 comprises a furnace, the walls of which are defined by a plurality of tubes. Whether the circulating fluidized bed (CFB) boiler 110 is being operated in an air fired mode or in an $O_2$ fired mode, fossil fuel nevertheless is combusted in the furnace and heat is generated from such combustion of the fossil fuel. More particularly, the air denoted in the drawings by the reference numeral 142 or the combined $O_2$ and recycled flue gas denoted in the drawings by the reference numeral 142', the latter sometimes being referred to as $O_2$ gas, is supplied to a lower portion of the furnace of the circulating fluidized bed (CFB) boiler 110. It is there in the lower portion of the furnace of the circulating fluidized bed (CFB) boiler 110 that the air 142 or the $O_2$ gas 142' is operative to effect the fluidization of the fossil fuel as well as to react with the mixture of the fossil fuel and of the sorbent denoted in the drawings by the reference numeral 114', which is being fed into the lower portion of the furnace of the circulating fluidized bed (CFB) boiler 110 for purposes of thereby aiding in effecting the combustion therein of the fossil fuel.

Regardless of whether the circulating fluidized bed (CFB) boiler is being fired with air or $O_2$, the air 142 or the $O_2$ gas 142', which is being employed for this purpose, is preferably fed to the circulating fluidized bed (CFB) boiler 110 both through a floor grate that is suitably provided therein for this purpose as well as through inlets that are suitably provided therein for this purpose at two levels, which are located above the floor grate, as best understood with reference to FIG. 1. Furthermore, to this end, preferably the mixture of the fossil fuel and of the sorbent 114' is fed to the furnace of the circulating fluidized bed (CFB) boiler 110 by means of air-assisted fossil fuel and sorbent feed nozzles (not shown in the drawings in the interest of maintaining clarity of illustration therein) in order to thereby advantageously minimize the size of the opening of the furnace wall penetrations as well as to minimize the possibility of plugging of the fuel feed chute.

The combustion, either by air fired or $O_2$ fired, of the fuel in the fuel and sorbent mixture 114' results both in the production of hot combustion gases, the latter commonly being referred to as flue gas, and in the production of hot solids, the latter commonly being referred to as ash. Some of the hot solids that are produced from such combustion fall to the bottom of the furnace. Ultimately these hot solids, which are denoted by the reference numeral 115 in the drawings, are suitably drained from the bottom of the furnace of the circulating fluidized bed (CFB) Boiler 110 to an ash cooler 116 of conventional construction or to some other functionally equivalent component.

However, many of the hot solids that are produced from such combustion of the fuel in the fuel and sorbent mixture 114' become entrained in the hot combustion gases, i.e., in the flue gas that is also produced from such combustion. The latter flue gas, having the hot solids entrained therein, rises within the furnace of the circulating fluidized bed (CFB) boiler 110, and is exhausted from the upper portion of the circulating fluidized bed (CFB) boiler 110 as the flue gas that is denoted by the reference numeral 104 in the drawings.

The furnace of the circulating fluidized bed (CFB) boiler 110 is suitably cooled by the transfer of heat that is generated from the combustion that takes place therewithin to a working fluid that is made to flow through the tubes that define the walls of the furnace. As described hereinabove, in accordance with this exemplary application of the steam generating system 100 constructed in accordance with the present invention, preferably the working fluid that is employed therein is $H_2O$. As heat is being transferred to this working fluid, the latter working fluid is caused to rise in an upwardly direction of flow in the tubes that define the walls of the furnace of the circulating fluidized bed (CFB) boiler 110. The working fluid 102, which has now been heated, ultimately is exhausted from the upper portion of the circulating fluidized bed (CFB) boiler 110 and is made to flow through suitable piping to a turbine denoted in the drawings by the reference numeral 190, which in accordance with this exemplary application of the steam generating system 100 constructed in accordance with the present invention, preferably is a steam turbine. The working fluid 102, which has now been heated, is designed to be operative to effect the driving therewith of the turbine 190. The turbine 190 in turn is designed to be operative to drive a generator (not shown in the interest of maintaining clarity of illustration in the drawings) in order to thereby enable such a generator to generate electricity.

Recycling Solids

Continuing with the description of this exemplary application of the steam generating system 100 constructed in accordance with the present invention, flue gas 104 is designed to be transported by suitable conventional ductwork to a hot solids-gas separator denoted in the drawings by the reference numeral 118, the latter preferably being in the form of a cyclone separator. This hot solids-gas separator 118 is designed to be operative to effect therewith the separation from the flue gas 104 of at least some of the hot solids that are entrained in the flue gas 104. Preferably, the hot solids-gas separator 118 embodies a plurality of tubes that are suitably integrated into the wall structure thereof. With further reference thereto, the hot solids-gas separator 118 preferably is cooled by virtue of a working fluid, which in accordance with the present invention preferably comprises either water or a mixture of water and steam, which is made to flow through the plurality of such tubes.

The mode of operation of the hot solids-gas separator 118 preferably is such that within the hot solids-gas separator 118, at least those hot solids that are above a predetermined size are caused separated from the hot flue gas in which such hot solids are entrained. It should be noted here that, although only one hot solids-gas separator 118 has been illustrated in the drawings, without departing from the essence of the present invention multiple hot solids-gas separators 118 could equally well be employed. If the steam generating system 100 constructed in accordance with the present invention is being operated in an air fired mode, the hot solids that are separated from the flue gas in the hot solids-gas separator will include unburned fuel, fly ash and sorbent. On the other hand, if the steam generating system 100 constructed in accordance with the present invention is being operated in an $O_2$ fired mode, the hot solids that are separated from the flue gas in the hot solids-gas separator will include unburned fuel, fly ash and sorbent, as well as $CO_2$ and water vapor in the void spaces. Continuing, the hot solids 112 that are separated from the flue gas are made to flow from the hot solids-gas separator 118 under the influence of gravity to one or both of two recycling paths, and ultimately are then reintroduced into the lower portion of the furnace of the circulating fluidized bed (CFB) boiler 110, whereupon the hot solids are then again subjected to combustion in the circulating fluidized bed (CFB) boiler 110.

Continuing with the discussion regarding the hot solids 112, the hot solids denoted in the drawings by the reference numeral 112a that have been separated from the flue gas are made to flow along one path directly back to the circulating fluidized bed (CFB) boiler 110 without being cooled. Whereas, the hot separated solids denoted in the drawings by the reference numeral 112b that have been separated from the flue gas are made to flow along another path back to the circulating fluidized bed (CFB) boiler 110 via a heat exchanger 136, the latter being operative to effect cooling of the hot solids 112b by virtue of the transfer of heat from the hot solids 112b to a working fluid before the hot solids 112b are returned to the circulating fluidized bed (CFB) boiler 110. It will be readily apparent to those skilled in the art that the working fluid that is made to flow in the heat exchanger 136 may, as desired, equally well without departing from the essence of the present invention be either of the same type or of a different type from that, which is made to flow in the circulating fluidized bed (CFB) boiler 110.

In accordance with the nature of the construction of the steam generating system 100 of the present invention, one or more fluidizing blower(s) 176 are employed for purposes of providing the fluidizing air 177 or the recycled flue gas 177' to the heat exchanger 136. If the steam generating system 100 of the present invention is being operated in an air fired mode, fluidizing blower(s) 176 are designed to be operative to provide fluidizing air 177 to the heat exchanger 136 in order to thereby fluidize the previously hot solids 112b after the previously hot solids have been subjected to cooling in the heat exchanger 136, and also to effect therewith the fluidization of the hot solids 112a that are traveling on the other path, as well as to cause the solids that have been fluidized thereby to flow to the circulating fluidized bed (CFB) boiler 110 for purposes of the recycling thereof. On the other hand, if the steam generating system 100 of the present invention is being operated in an $O_2$ fired mode, fluidizing blower(s) 176 are designed to be operative to cause the fluidizing recycled flue gas 177' to flow to the heat exchanger 136 in order to thereby fluidize the previously hot solids 112b after the previously hot solids 112b have been subjected to cooling in the heat exchanger 136, and also to effect therewith the fluidization of the hot solids 112a that are traveling along the other path, as well as to cause the solids that have been fluidized thereby to flow to the circulating fluidized bed (CFB) boiler 110 for purposes of the recycling thereof. The recycled solids are designed to be injected into the circulating fluidized bed (CFB) boiler 110 and for purposes of being subjected to combustion therewithin.

To this end, the solids 112 after being separated from the flue gas are made to flow from the lower portion of the combined hot solids-gas separator 118. Typically one or more ash control valves (not shown in the interest of maintaining clarity of illustration in the drawings) are employed for purposes of effecting therewith control over the flow of the hot solids after the separation from the flue gas between the two paths to which reference has been had hereinbefore. As has been described previously hereinabove, one of these paths provides a direct connection to the lower portion of the furnace of the circulating fluidized bed (CFB) boiler 110 whereas the other one of these paths provides an indirect connection to the lower portion of the furnace of the circulating fluidized bed (CFB) boiler 110.

Further in this regard, the hot solids 112a after having been separated from the flue gas are made to flow along one path so as to thereby be fed directly to the lower portion of the furnace of the circulating fluidized bed (CFB) boiler 110. On the other hand, the hot solids 112b after having been separated from the flue gas are made to flow along the other one of the paths so as to thereby be fed indirectly to the lower portion of the furnace of the circulating fluidized bed (CFB) boiler 110 after these hot solids 112b have been made to flow through the heat exchanger 136, which preferably in accordance with the present invention comprises a fluidized bed heat exchanger (FBHE). It should be readily apparent to those skilled in the art that although a single heat exchanger 136 has been illustrated in the drawings, if the nature of the application in which the steam generating system 100 of the present invention is being employed is such that the steam generating system 100 of the present invention includes multiple hot solids-gas separators 118, then a separate heat exchanger typically would be provided for each such one of the multiple hot solids-gas separators. The hot solids 112b after having been separated from the flue gas that are made to flow along the second one of the paths are subjected to cooling by virtue of the transfer of heat therefrom to a working fluid, which in accordance with the present invention this working fluid preferably comprises either water or a water-steam mixture, and which are made to flow through tubes that are suitably disposed within the heat exchanger 136, such as to thereby result in a cooling of the hot solids 112b, the latter solids after having been subjected to such cooling being denoted in the drawings by the reference numeral 112c, which are then made to flow to the lower portion of the furnace of the circulating fluidized bed (CFB) boiler 110. By exercising control over the flow of and the splitting of the hot solids between the two paths by employing any component of conventional construction, such solids can accordingly then be made to flow along either one of the two paths, or can be made to flow simultaneously along both paths to the lower portion of the furnace of the circulating fluidized bed (CFB) boiler 110, such as to be thereby operative to cause a non-cooled stream of hot solids and/or a cooled stream of previously hot solids to be returned to the circulating fluidized bed (CFB) boiler 110. By exercising such control over the flow of the hot solids and/or over the flow of the previously hot solids this in turn enables the temperature in the circulating fluidized bed (CFB) boiler 110 to be controlled in response to the nature of the flow of re-circulated solids that the circulating fluidized bed (CFB) boiler 110 is made to receive.

As described previously herein above, if the steam generating system 100 constructed in accordance with the present invention is being operated in an air fired mode, the air 177 is designed to be operative to effect the fluidization of the hot solids 112a and of the cooled solids 112c, and also is designed to be operative to effect the flow of the fluidized hot solids 112a and of the fluidized cooled solids 112c to the lower portion of the furnace of the circulating fluidized bed (CFB) boiler 110. On the other hand, if the steam generating system 100 constructed in accordance with the present invention is being operated in an $O_2$ fired mode, the fluidizing recycled flue gas 177' is designed to be operative to effect the fluidization of the hot solids 112a and of the cooled solids 112c, and also is designed to be operative to effect the flow of the fluidized hot solids 112a and of the cooled solids 112c to the lower portion of the furnace of the circulating fluidized bed (CFB) boiler 110.

Preheating the Fluidizing Air or $O_2$ Gas

The remainder of the hot solids, i.e., those hot solids that are below a predetermined size, remain entrained in the flue gas denoted in the drawings by the reference numeral 106 from which the hot solids above a predetermined size have been separated that is made to flow through suitable ductwork of conventional construction from the hot solids-gas separator 118 to the backpass, the latter being denoted in the drawings by the reference numeral 122. The backpass 122 embodies a plurality of tubes that are suitably integrated into the wall structure thereof. The backpass 122 in accordance with the present invention is preferably cooled by means of a working fluid that is made to flow through this plurality of tubes. In the exemplary application of the steam generating system 100 constructed in accordance with the present invention that is being described, this latter working fluid is preferably water or a mixture of water and steam, although without departing from the essence of the present invention another type of working fluid could equally well be employed, if so desired. In the backpass 122, an additional transfer of heat is made to occur for purposes of thereby effecting a cooling of the flue gas and of any hot solids that may remain entrained in the flue gas. Further ductwork is suitably provided in accordance with the present invention through which the cooled flue gas denoted in the drawings by the reference numeral 150 is made to flow from the backpass 122 to a preheater 144, the latter being designed so as to be capable of effecting therewith the preheating either of air or of $O_2$ gas. In accordance with the present invention the preheater 144 preferably comprises a zero leakage tubular preheater.

Preferably, in accordance with the mode of operation of the present invention fluidizing air 188 or $O_2$ gas 188' is made to flow through suitable ductwork of conventional construction to the preheater 144 before the fluidizing air 188 or $O_2$ gas 188' is injected into the furnace of the circulating fluidized bed (CFB) boiler 110. The preheater 144 is designed to be operative to effect the transfer of heat from the flue gas 150, which is made to flow through the backpass 122 to the fluidizing air 188 or $O_2$ gas 188', such that the fluidizing air 188 or $O_2$ gas 188' as a consequence of such transfer of heat thereto is preheated to a desired temperature. As best understood with reference to FIG. 1, the air 188 or $O_2$ gas 188' is subjected to pressurization and is made to flow to the preheater 144, and then ultimately to the circulating fluidized bed (CFB) boiler 110, by one or more blowers 180, 181 which are illustrated in the drawings as being either primary air fans (PA) fans 180 or secondary air fans 101 (SA) fans. The air denoted in the drawings by the reference numeral 142 after being preheated in the preheater 144 or the $O_2$ gas denoted in the drawings by the reference numeral 142' after being preheated in the preheater 144 is made to flow through suitable ductwork of conventional construction from the preheater 144 to the furnace of the circulating fluidized bed (CFB) boiler 110. The flue gas denoted in the drawings by the reference numeral 154, with the remaining solids entrained therewith, is made to flow through suitable ductwork of conventional construction from the preheater 144 to a particulate removal component 152 that constitutes a part of the APC subsystem with which the steam generating system 100 constructed in accordance with the present invention is suitably provided. While the steam generating system 100 is shown having a PA fan 180 and a SA fan 181, the invention contemplates that a single fan may replace the PA and SA fans.

Downstream Flue Gas Processing

The particulate removal component 152 to which reference has been had above previously, in accordance with the present invention is preferably illustrated as being an electrostatic precipitator system (ESP) or baghouse. Continuing, the particulate removal component 152 is designed to be operative to effect therewith the removal of the relatively fine solids that remain still entrained within the flue gas 154. If the steam generating system 100 constructed in accordance with the present invention is being operated in an air fired mode, the flue gas denoted in the drawings by the reference numeral 158 upon exiting from the particulate removal component 152 is made to flow via some more suitable ductwork of conventional construction directly to a blower denoted in the drawings by the reference numeral 162, which as illustrated in FIG. 1 comprises an induced draft (ID) fan. On the other hand, if the steam generating system 100 constructed in accordance with the present invention is being operated in an $O_2$ fired mode, the flue gas 158 upon exiting from the particulate removal component 152 is made to flow indirectly to the fan 162, as will be described in more detail hereinafter.

If the steam generating system 100 constructed in accordance with the present invention is being operated in an air fired mode, all of the flue gas denoted in the drawings by the reference numeral 164 upon exiting from the blower 162 is made to flow via some more suitable ductwork of conventional construction towards the exhaust stack (not shown in the interest of maintaining clarity of illustration in the drawings), and in doing so is typically made to flow through other additional components of the APC subsystem with which the steam generating system 100 constructed in accordance with the present invention is suitably provided, before reaching said exhaust stack. If the steam generating system 100 constructed in accordance with the present invention is being operated in an $O_2$ fired mode, only a portion of the flue gas denoted in the drawings by the reference numeral 164' upon exiting from the blower 162 is made to flow towards the exhaust stack (not shown in the interest of maintaining clarity of illustration in the drawings), as will be described in more detail hereinafter.

Retrofitting for $O_2$ Firing and Related Operational Changes

As has been indicated hereinabove previously, while the steam generating system 100 constructed in accordance with the present invention is designed to be operated in an air fired mode, the steam generating system 100 constructed in accordance with the present invention can also easily be retrofitted so as to be capable of being operated in an $O_2$ fired mode. In order to be able to be so operated in an $O_2$ fired mode, various components, which are designated in FIG. 1 as being "optional", are required to be added to the steam generating system 100. To this end, the steam generating system 100 more specifically must be fitted, by way of exemplification, with an oxygen source denoted in the drawings by the reference numeral 140, a parallel feed fluid heater (PFFH) denoted in the drawings by the reference numeral 182, a gas cooler denoted in the drawings by the reference numeral 160, flue gas recirculation ductwork for the streams denoted in the drawings by the reference numbers 165*a* and 165*b*, respectively, and a gas processing component denoted in the drawings by the reference numeral 166. These above-identified components and the changes in operational flows within the steam generating system 100 when the steam generating system 100 constructed in accordance with the present invention is being operated in the $O_2$ fired mode are described in more detail hereinafter.

The $O_2$ Source and Preheating the Fluidizing $O_2$ Gas

Continuing with the description of the steam generating system 100 constructed in accordance with the present invention when the steam generating system 100 is being operated in the $O_2$ fired mode, the oxygen source 140 preferably comprises an air separation unit that is designed to be operative to effect the separation therewith of $O_2$ from an ambient air feed stream denoted in the drawings by the reference numeral 138 in order to thereby produce a stream of oxygen denoted in the drawings by the reference numeral 139 of a desired oxygen purity. With further reference thereto, the oxygen source 140 can, if so desired, without departing from the essence of the present invention, comprise a cryogenic plant, the latter being designed to be capable of producing $O_2$ of a purity of at least ninety-five percent (95%). In addition, the oxygen source 140 can also, if so desired, without departing from the essence of the present invention be designed so as to be capable of producing nitrogen ($N_2$), the latter being denoted in the drawings by the reference numeral 141. To this end, the $N_2$ 141 that is so produced by the oxygen source 140, if is the oxygen source 140 has been configured to produce this end product, can, by way of exemplification and not limitation, be employed for purposes of enhanced oil recovery (EOR) therewith or can be exhausted to the atmosphere. In accordance with still another alternative thereof, the oxygen source 140 without departing from the essence of the present invention could comprise an apparatus that incorporates therein an oxygen transport membrane.

Continuing, irrespective of the type of oxygen source 140 there is employed, as has been described hereinabove, the $O_2$ denoted in the drawings by the reference numeral 139 is made to flow, as part of the $O_2$ gas denoted in the drawings by the reference numeral 188' that is designed to be employed for fluidizing purposes, through suitable ductwork of conventional construction to the preheater 144 before to the fluidizing $O_2$ gas 188' is injected into the furnace of the circulating fluidized bed (CFB) boiler 110. In accordance with the discussion that has been set forth hereinbefore, the preheater 144 is designed to be operative to transfer heat from the flue gas denoted in the drawings by the reference numeral 150, which is made to flow from the backpass 122 to the fluidizing $O_2$ gas 188', such that the fluidizing $O_2$ gas 188' is thereby preheated to a desired temperature. After being so preheated, the fluidizing $O_2$ gas 188' that is now denoted in the drawings by the reference numeral 142' is then made to flow through suitable ductwork of conventional construction to the furnace of the circulating fluidized bed (CFB) boiler 110. As has been described previously hereinabove, the blower(s) 180, 181 are designed to be operative both to sufficiently pressurize the fluidizing $O_2$ gas 188' so as to thereby enable the fluidizing $O_2$ gas 188' to be made to flow to the preheater 144 and to sufficiently pressurize the preheated $O_2$ gas 142' so as to thereby enable the preheated $O_2$ gas 142' to be made to flow to the circulating fluidized bed (CFB) boiler 110.

Downstream Flue Gas Processing to Heat Additional Working Fluid that Drives a Turbine Next, insofar as the PFFH 182 is concerned, the latter in the exemplary application of the steam generating system 100 constructed in accordance with the present invention being described as a parallel feed water heater (PFWH), receives via additional suitable ductwork of conventional construction the flue gas denoted in the drawings by the reference numeral 158 that exits from the particulate removal component 152. Continuing with the discussion thereof, the PFFH 182 is operative to effect the transfer of heat from the flue gas 158 to the feed working fluid denoted in the drawings by the reference numeral 184, which in this exemplary application of the steam generating system 100 constructed in accordance with the present invention comprises $H_2O$ in liquid form, is the latter commonly being referred to in the industry as feed water. Such transfer of heat from the flue gas 158 to the feed working fluid 184 is capable of being controlled using known techniques such that the feed working fluid 184 is subjected to being heated to the desired temperature. After being so heated, the heated working fluid denoted in the drawings now by the reference numeral 186 is then made to flow to the turbine system 190. The turbine system 190 in accordance with the present invention is preferably equipped so as to be capable of effecting therewith low level heat recovery from the PFFH 182 and so as to be capable of recovering as well heat from the compressor intercoolers. To this end, the low temperature feed water is designed to be used for purposes of recovering heat from the compressor intercoolers that are used in the gas processing system 166 and/or from that in the air separation unit 140. With further reference thereto, the flue gas denoted in the drawings by the reference numeral 159 that exits from the PFFH 182 is made to flow through suitable ductwork of conventional construction to the gas cooler 160.

Added Downstream Flue Gas Processing to Remove $H_2O$

It is to be noted here that, when the steam generating system 100 constructed in accordance with the present invention is being operated in the $O_2$ firing mode, the two largest constituent elements by volume of the flue gas that exits from the backpass 122, if the steam generating system 100 of the present invention is being fired with coal, are $CO_2$ and $H_2O$. This composition of the flue gas results from the combustion of the coal within the circulating fluidized bed (CFB) boiler 110 that takes place in the circulating fluidized bed (CFB) boiler 110 in the presence of the pure or nearly pure oxygen denoted in the drawings by the reference numeral 139 that is supplied thereto from the oxygen source 140 as well as in the presence of the recycled flue gas denoted in the drawings by the reference numeral 164*b*.

Continuing, it is in the gas cooler 160, where some of the $H_2O$ vapor in the flue gas denoted in the drawings by the reference numeral 159 is condensed out of the flue gas 159. The gas cooler 160 in accordance with the present invention preferably is capable of accomplishing this by virtue of causing the flue gas 159 to be placed in the gas cooler 160 in contact with relatively colder water in a countercurrent manner, whereby a relatively significant proportion of the $H_2O$ vapor in the flue gas 159 is caused to condense into liquid water and to separate from the flue gas 159. In accordance with the present invention, the gas cooler 160 preferably is designed to be operative to cool the flue gas 159 to the lowest temperature possible before the flue gas 159 is recycled, in order to thereby minimize the amount of power that the fluidizing blowers 180 and 176 require. After flowing through the gas cooler 160, the flue gas 161, which now is comprised mainly of $CO_2$, is made to flow through suitable ductwork of conventional construction to the blower 162.

In accordance with the present invention, the blower 162 preferably is designed so as to be capable of operating both when the steam generating system 100 constructed in accordance with the present invention is being operated in the air fired more and when the steam generating system 100 constructed in accordance with the present invention is being operated in the $O_2$ fired mode. To this end, it is to be noted here that in accordance with the present invention there is a need to suitably adjust the operation of the blower 162 in order that the operation of the blower 162 corresponds to whether the steam generating system 100 constructed in accordance with the present invention is being operated in the air fired mode or in the $O_2$ fired mode. There are various techniques, which are well known to those skilled in the art, that routinely can be employed in order to determine therefrom the appropriate adjustment that should be made insofar as the blower 162 is concerned depending on whether the steam generating system 100 constructed in accordance with the present invention is being operated in the air fired mode or in the $O_2$ fired mode.

Downstream Flue Gas Processing to Capture $CO_2$ and Provide a Source of Recyclable Flue Gas In accordance with the present invention the flue gas denoted in the drawings by the reference numeral 164' exits from the blower 162 in a stream, and preferably is split or segregated, so as to be made to flow along three separate paths. To this end, the majority of the flue gas 164' is made to flow through suitable ductwork of conventional construction along one path to a location where the flue gas 164' can be further processed and thereafter can be used or sequestered. More specifically, the flue gas denoted in the drawings by the reference numeral 164*a* is made to flow to a liquid recovery subsystem 166 that is designed to be operable to effect therewith the liquefying of the $CO_2$ that is entrained within the flue gas 164*a* so as to thereby produce a liquid $CO_2$ end product that is suitable for use in a commercial application. As is the case with the $N_2$, said liquid $CO_2$ end product similarly could, by way of exemplification and not limitation, be utilized for purposes of enhanced oil recovery (EOR) or could be sequestered.

Continuing, in accordance with the present invention another portion of the flue gas 164' is made to flow along another path for purposes of thereby being recycled back into the circulating fluidized bed (CFB) boiler 110. Typically, such another portion of the flue gas 164', which is denoted in the drawings by the reference numeral 164*b*, is only a small fraction of the total amount of the flue gas 164' that is made to flow from the gas cooler 160. To this end, the flue gas 164*b* is made to flow through suitable ductwork of conventional construction both to the fluidizing blower 176 and to the fluidizing blower 180, 181. More specifically, the flue gas 164*b* in accordance with the present invention preferably is split into a stream of flue gas denoted in the drawings by the reference numeral 164*b*' that is made to flow through suitable ductwork of conventional construction to the fluidizing air blower(s) 176 and into a stream of flue gas denoted in the drawings by the reference numeral 164*b*" that is made to flow through suitable ductwork of conventional construction to the blower(s) 180, 181.

In accordance with the present invention, the fluidizing blower(s) 180, 181 preferably are designed to be capable of operating both when the steam generating system 100 constructed in accordance with the present invention is being operated in the air fired mode and when the steam generating system 100 constructed in accordance with the present invention is being operated in the $O_2$ fired mode. To this end, it is to be noted here that in accordance with the operation of the blower(s) 180, 181 there is a need to suitably adjust the operation of the fluidizing blower(s) 180, 181 to correspond to whether the steam generating system 100 constructed in accordance with the present invention is being operated in the air fired mode or in the $O_2$ fired mode. Here once again, there are various techniques, which are well known to those skilled in the art, that routinely can be employed in order to determine therefrom the appropriate adjustment that should be made insofar as the fluidizing blower(s) 180, 181 are concerning depending on whether the steam generating system 100 constructed in accordance with the present invention is being operated in the air fired mode or in the $O_2$ fired mode. With further reference thereto, the stream of flue gas denoted in the drawings by the reference numeral 164*b*" exiting from the fluidizing blower(s) 180, 181 preferably is combined with the stream of $O_2$ denoted in the drawings by the reference numeral 139 in order to thereby create the stream of gas denoted in the drawings by the reference numeral 188' that is made to flow to the preheater 144.

In accordance with the present invention, the fluidizing blower(s) 176 preferably are also designed to be capable of operating both when the steam generating system 100 constructed in accordance with the present invention is being operated in the air fired mode and when the steam generating system 100 constructed in accordance with the present invention is being operated in the $O_2$ fired mode. To this end, it is to be noted here that in accordance with the operation of the fluidizing blower(s) 176 there is a need to suitably adjust the operation of the fluidizing blower(s) 176 to correspond to whether the steam generating system 100 constructed in accordance with the present invention is being operated in the air fired mode or in the $O_2$ fired mode. Here once again, there are various techniques, which are well known to those skilled in the art, that routinely can be employed in order to determine therefrom the appropriate adjustment that should be made insofar as the fluidizing blower(s) 176 are concerned depending on whether the steam generating system 100 constructed in accordance with the present invention is being operated in the air fired mode or in the $O_2$ fired mode. With further reference thereto, the flue gas 164*b*' exits from the fluidizing blower(s) 176 as the stream of gas denoted in the drawings by the reference numeral 177' and is thereafter made to flow to the heat exchanger 136.

As in the case when the steam generating system 100 constructed in accordance with the present invention is being operated in the air fired mode, the fluidizing blower(s) 176 and the fluidizing blower(s) 180, 181 are each designed to function to cause fluidizing gas to be supplied both to the circulating fluidized bed (CFB) boiler 110 and to the heat exchanger 136. However, rather than the fluidizing gas being air, the fluidizing gas now includes both $O_2$ from the oxygen source 140 and $CO_2$ from the gas cooler 160. Continuing, the portion of the flue gas 164' that is segregated so as to thereby form therefrom the flue gas 164b is established to be a specified amount as a function of the amount of flue gas that is needed for purposes of effecting the required fluidization therewith both in the circulating fluidized bed (CFB) boiler 110 and in the heat exchanger 136. To this end, after the steam generating system 100 constructed in accordance with the present invention has been converted to an $O_2$ firing mode, the blowers 176 and 180, 181 are preferably adjusted so that the amount of flue gas that is caused to be recycled thereby to the circulating fluidized bed (CFB) boiler 110 is such as to result in velocities being produced therefrom that are equivalent throughout the steam generating system 100 to those that are present when the steam generating system 100 constructed in accordance with the present invention is being operated in the air firing mode, in order to thereby maintain both the same working fluid output and the same temperatures as those that are obtained when the steam generating system 100 constructed in accordance with the present invention is being operated in the air fired mode.

Thus, briefly by way of a summary herein of the preceding first embodiment of the present invention, which has been described hereinabove, provides in accordance with the present invention a way to facilitate the conversion of an air fired steam generating system in order to thereby enable such an air fired steam generating system to be converted to an $O_2$ firing mode and concomitantly therewith enable the capture of the generated $CO_2$ that results from such $O_2$ firing to be realized, at less expense and/or at greater efficiency than has heretofore been possible using previously known ways. It is thus possible through the utilization of the present invention to effect a minimization of the pre-investment cost associated both with the firing of pulverized coal or another fossil fuel with $O_2$ rather than air, and with also the capture of the $CO_2$ end product generated from such $O_2$ firing, while concomitantly permitting the energy penalty that is incurred for purposes of effecting $CO_2$ capture to be maintained at approximately a 25% reduction of net electrical output. It should be noted here that by utilizing the present invention, it is possible such that the conversion of the steam generating system of the present invention from air firing to $O_2$ firing requires no modification either to the pressure parts of the air fired steam generating system, or to various other ones of the components of the air fired steam generating system.

Second Embodiment

Dual Mode System Components and Operations

Figure 2:
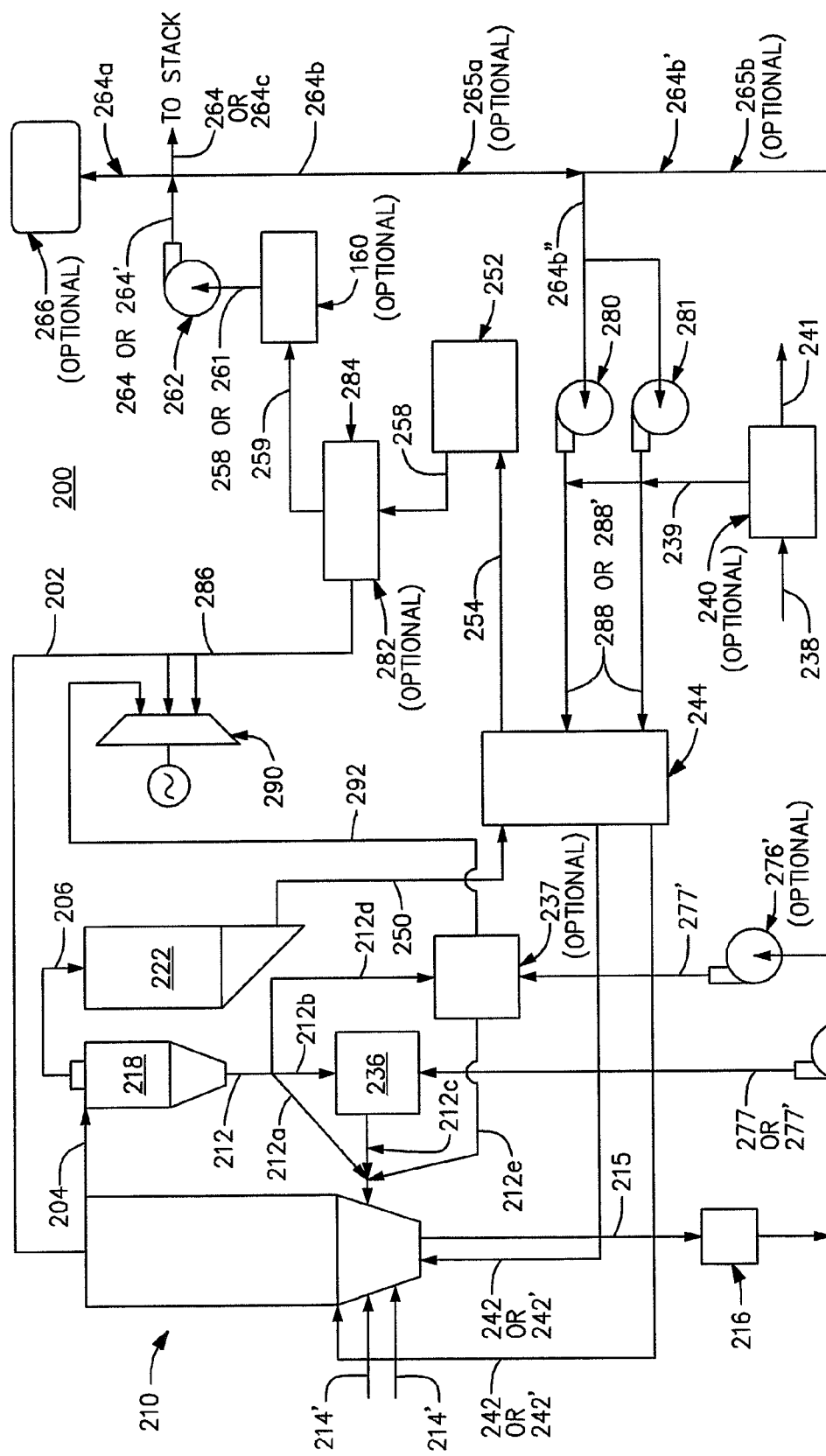
FIG. 2 is a schematic illustration of an air or oxygen fired steam generating system that includes a circulating fluidized bed (CFB) boiler, which is capable of being employed for purposes of effecting therewith the capture of a carbon dioxide ($CO_2$) end product when being operated in an oxygen firing mode, constructed in accordance with a second embodiment of the present invention.

In FIG. 2 there is illustrated a schematic view of an exemplary air fired or oxygen ($O_2$) fired steam generating system 200, constructed in accordance with a second embodiment of the present invention. The steam generating system 200, is capable of using air, or when fitted with selected optional components is capable of using $O_2$ in lieu of air, for purposes of effecting therewith the combustion of fossil fuel.

In the particular exemplary application of the present invention that is described below, the fossil fuel that is employed therewith is crushed coal. It should be understood, however, that without departing from the essence of the present invention other types of fossil fuels could equally well be utilized in lieu of such crushed coal. To this end, preferably a fossil fuel having a high carbon content such as crushed coal or petcoke, or a biomass is employed in this regard. Continuing, the working fluid that is employed therewith in accordance with the present invention preferably is $H_2O$, the latter being in the form of either a liquid, or a gaseous or mixed liquid, or a gaseous state at various different points. However, here again it should be readily apparent to those skilled in the art that without departing from the essence of the present invention other types of working fluids could equally well be utilized in lieu of $H_2O$. Furthermore, in addition it will be readily apparent to those skilled in the art that without departing from the essence of the present invention the working fluids, which flow within the various components that are employed in the present invention could be also of different types.

When being operated in an air fired mode, the steam generating system 200 is capable in accordance with the present invention of being operated as a single cycle power generating system in order to thereby generate electrical power therewith. However, when being operated in an $O_2$ firing mode, the steam generating system 200 is capable in accordance with the present invention of being operated as a combined cycle power generating system in order thereby both to generate electrical power and to produce a carbon dioxide ($CO_2$) end product therewith. When being operated in an $O_2$ firing mode, the steam generating system 200 of the present invention may also optionally without departing from the essence of the present invention be made to produce a nitrogen ($N_2$) end product.

Whereas the steam generating system 100 that has been described hereinabove is particularly advantageously characterized in that the pre-investment cost associated therewith is minimized, while concomitantly an energy penalty for effecting the capture of $CO_2$ therewith is at the same time incurred through the use thereof, the steam generating system 200 of the present invention is particularly advantageously characterized in that through the use thereof any electrical output penalty for $CO_2$ capture is minimized or even eliminated therewith. To this end, when the steam generating system 200 of the present invention is being operated in an $O_2$ firing mode, approximately the same net electrical output can be obtained therefrom as when the steam generating system 200 constructed in accordance with the present invention is being operated in an air fired mode.

Operational Changes from the Air Fired Mode to the $O_2$ Firing Mode and Related Component Sizing Functionally, all of the components of the steam generating system 200 of the present invention that are also found in the steam generating system 100 of the present invention are designed to perform identically as such components do in the steam generating system 100 of the present invention. However, as will be described in more detail hereinafter, when the steam generating system 200 of the present invention is being operated in the $O_2$ firing mode, the capacity of the flows that must be handled by the components in the steam generating system 200 of the present invention, which are identical to the components that are to be found in the steam generating system 100 of the present invention, will differ from the flows that are handled by such corresponding components that are found in the steam generating system 100 of the present invention. To this end, attributes of such components, such as, by way of exemplification and not limitation, the volume and/or the temperature, of the flows handled thereby will differ. For example, when the steam generating system 200 of the present invention is being operated in the air fired mode, the flow of the working fluid denoted in the drawings by the reference numeral 202 that exits from the circulating fluidized bed (CFB) boiler 210 may be of the same volume as the flow of the working fluid flow denoted in the drawings by the reference numeral 102 that exits from the circulating fluidized bed (CFB) boiler 110. Whereas, when the steam generating system 200 of the present invention is being operated in the $O_2$ firing mode, the flow of the working fluid denoted in the drawings by the reference numeral 202' that exits from the circulating fluidized bed (CFB) boiler 210 will have a higher volume than the flow of the working fluid 202 that exits from the circulating fluidized bed (CFB) boiler 210 when the steam generating system 200 of the present invention is being operated in an air fired mode. As will be discussed in more detail hereinafter, in the case of at least some of such of these components, there may be found to be a need for some one or more of such of these components itself to be upsized, i.e., to be increased in size, when the steam generating system 200 of the present invention is being operated in an $O_2$ firing mode such that such a component is somewhat oversized for purposes of the operation of the steam generating system 200 of the present invention in the air fired mode. However, in the case of others of such of these components, only an adjustment in the operational control of such a component will be required when the steam generating system 200 of the present invention is being operated in an $O_2$ firing mode as compared to when the steam generating system 200 of the present invention is being operated in an air fired mode. Hence, in such a case such a component can be identical to that of the component corresponding thereto in the steam generating system 100 of the present invention.

Accordingly, as will be described further hereinafter, in the steam generating system 200 of the present invention, for purposes of the operation thereof in the $O_2$ firing mode some of the components of the steam generating system 200 of the present invention are suitably sized above what is necessary for the operation thereof when the steam generating system 200 of the present invention is being operated in the air fired mode. To this end, preferably such components are designed to be upsized, i.e., the size thereof is suitably increased, so as to provide approximately twenty-five percent (25%) more capacity when the steam generating system 200 of the present invention is being operated in an $O_2$ firing mode than that, which is required when the steam generating system 200 of the present invention is being operated in the air fired mode. This extra capacity of such components is utilized only when the steam generating system 200 of the present invention is being operated in the $O_2$ firing mode in order to thereby reduce or in order to thereby eliminate the electrical output penalty that conventionally is imposed for purposes of the $CO_2$ capture that is designed to take place when the steam generating system 200 of the present invention is being operated in the $O_2$ firing mode.

Fluidizing and Combusting Fuel to Heat the Working Fluid that Drives a Turbine

When the steam generating system 200 of the present invention is being operated in the $O_2$ firing mode, the amount of fossil fuel and sorbent denoted in the drawings by the reference numeral 214' that is injected into the circulating fluidized bed (CFB) boiler 210 is preferably increased by an amount of approximately 25% in comparison to the amount of fossil fuel and sorbent denoted in the drawings by the reference numeral 214 that is injected into the circulating fluidized bed (CFB) boiler 210 when the steam generating system 200 of the present invention is being operated in the air fired mode. The amount of fossil fuel and sorbent 214' that is injected into the circulating fluidized bed (CFB) boiler 210 when the steam generating system 200 of the present invention is being operated in the O2 firing mode preferably will also be approximately 25% greater than the amount of fossil fuel and sorbent denoted in the drawings by the reference numeral 114' that is injected into the circulating fluidized bed (CFB) boiler 110 of the steam generating system 100 of the present invention when the steam generating system 100 of the present invention is being operated in the $O_2$ firing mode, if the steam generating system 200 of the present invention and the steam generating system 100 of the present invention both generate the same amount of net power when they are each being operated in the air fired mode. Accordingly, the components (not shown in the interest of maintaining clarity of illustration in the drawings) for purposes of transporting the fossil fuel and sorbent 214 and the fossil fuel and sorbent 214', respectively, to the circulating fluidized bed (CFB) boiler 210 may also need to be upsized, i.e., increased in size, in order to have a capacity of approximately 25% more than that of the components (also not shown in the interest of maintaining clarity of illustration in the drawings) that are employed for purposes of transporting the fossil fuel and sorbent 114' to the circulating fluidized bed (CFB) boiler 110.

Because of the increase in the amount of fossil fuel and sorbent 214' that is injected into the circulating fluidized bed (CFB) boiler 210 when the steam generating system 200 of the present invention is being operated in the $O_2$ firing mode, the amount of hot solids that fall to the bottom of the circulating fluidized bed (CFB) boiler 210 will also increase correspondingly. Continuing, ultimately these hot solids, which are denoted in the drawings by the reference numeral 215, are drained from the bottom of the circulating fluidized bed (CFB) boiler 210 to an ash cooler 216 of conventional construction, the latter preferably being sized so as to be approximately 25% larger than the size thereof that is necessary when the steam generating system 200 of the present invention is being operated in the air fired mode. To this end, the ash cooler 216 will also be approximately 25% larger in size than the ash cooler 116, if the steam generating system 200 of the present invention and the steam generating system 100 of the present invention both generate about the same amount of net power when they are each being operated in the air fired mode.

The turbine 290 of the steam generating system 200 of the present invention preferably can be modified for purposes of providing therewith approximately 25% greater capacity than that which is necessary when the steam generating system 200 constructed in accordance with the present invention is being operated in the air fired mode. If the steam generating system 100 of the present invention and the steam generating system 200 of the present invention both generate about the same amount of net power when each is being operated in the air fired mode, then the turbine 290 will thereby also have a correspondingly greater capacity than does the turbine 190 of the steam generating system 100 of the present invention. This increased capacity of the turbine 290 may, by way of exemplification, be accomplished through the use of different types of turbine blades in the turbine 290 from the turbine blades that are utilized in the turbine 190. For instance, it may be possible without departing from the essence of the present invention to effect the re-blading of a turbine that is identical to the turbine 190 in order to thereby create therefrom the turbine 290.

With further reference to the foregoing discussion, the volume of the flow of the heated working fluid to the turbine 290, when the steam generating system 200 of the present invention is being operated in the air fired mode, will differ from that the volume of the flow of the heated working fluid to the turbine 290 when the steam generating system 200 of the present invention is being operated in the $O_2$ firing mode.

If the steam generating system 200 of the present invention and the steam generating system 100 of the present invention both generate about the same amount of net power when they are each being operated in the air fired mode, the flow to the turbine 290 when the steam generating system 200 constructed in accordance with the present invention is being operated in the $O_2$ firing mode will also differ from that of the flow to the turbine 190 of the steam generating system 100 of the present invention when the steam generating system 100 of the present invention is being operated in the $O_2$ firing mode. To this end, the volume of the flow from the circulating fluidized bed (CFB) boiler 210 of the heated working fluid denoted in the drawings by the reference numeral 202' when the steam generating system 200 of the present invention is being operated in the $O_2$ firing mode will exceed that of the volume of flow from the circulating fluidized bed (CFB) boiler 210 of the heated working fluid denoted in the drawings by the reference numeral 202 when the steam generating system 200 of the present invention is being operated in the air fired mode. In addition, as will be discussed in more detail hereinafter, a new flow of superheated steam denoted in the drawings by the reference numeral 292 is also supplied to the turbine 290 when the steam generating system 200 constructed in accordance with the present invention is being operated in the $O_2$ firing mode.

The upsizing of, i.e., the increase in, the capacity of turbine 290 in turn will require that the electricity generator (not shown in the interest of maintaining clarity of illustration in the drawings) for the steam generating system 200 of the present invention be modified preferably so as to increase the capacity thereof by approximately 25% more than the capacity that is necessary when the steam generating system 200 constructed in accordance with the present invention is being operated in the air fired mode. In this case also, if the steam generating system 200 of the present invention and the steam generating system 100 of the present invention both generate about the same amount of net power when they are each being operated in the air fired mode, the electricity generator (not shown in the interest of maintaining clarity of illustration in the drawings) for the steam generating system 200 of the present invention will also have approximately 25% more capacity than does the electricity generator (also not shown in the interest of maintaining clarity of illustration in the drawings) for the steam generating system 100 of the present invention.

Continuing with the description of the steam generating system 200 constructed in accordance with the present invention, the boiler feed fluid heaters, pumps and condensers (all not shown in the interest of maintaining clarity of illustration in the drawings) of the steam generating system 200 of the present invention will necessarily also each have a correspondingly greater capacity than that which is needed when the steam generating system 200 of the present invention is being operated in the air fired mode. Or, the same equipment could be operated in order to thereby produce a different performance with 25% more flow. In this case also, if the steam generating system 200 of the present invention and the steam generating system 100 of the present invention both generate about the same amount of net power when they are each being operated in the in the air fired mode, the boiler feed heaters, pumps and condensers of the steam generating system 200 of the present invention will also each have a correspondingly greater capacity than do the boiler feed heaters, pumps and condensers (also all not shown in the interest of maintaining clarity of illustration in the drawings) of the steam generating system 100 of the present invention.

Operation in the Air Fired Mode

Although the capacity of some of the dual mode components that are included in the steam generating system 100 constructed in accordance with the present invention, which has been described hereinbefore with reference to FIG. 1, is increased for purposes of the utilization thereof in the steam generating system 200 of the present invention when the steam generating system 200 constructed in accordance with the present invention is being operated in the $O_2$ firing mode, when the steam generating system 200 constructed in accordance with the present invention is being operated in the air fired mode, the operation of the steam generating system 200 of the present invention is substantially identical to that of the steam generating system 100 of the present invention. However, as will be described in more detail hereinafter, although when for the steam generating system 200 constructed in accordance with the present invention is converted to the $O_2$ firing mode not only is the capacity of some of the components that are utilized in the $O_2$ firing mode when the steam generating system 100 of the present invention is being so operated that have been described herein before with reference to FIG. 1 is increased for purposes of enabling such components to be employed in the steam generating system 200 of the present invention, an additional component is required also for purposes of enabling the steam generating system 200 constructed in accordance with the present invention to be operative in the $O_2$ firing mode. Accordingly, by virtue of the inclusion of this additional component therein, the operation of the steam generating system 200 constructed in accordance with the present invention differs from the operation of that of the steam generating system 100 constructed in accordance with the present invention when the steam generating system 100 of the present invention is being operated in the $O_2$ fired mode.

Changes for Purposes of the Conversion to the $O_2$ Firing Mode

There follows hereinafter a description of the differences that exist in those components that are added for purposes of enabling the steam generating system 200 to be operated in accordance with the present invention in the $O_2$ firing mode, as compared with the components corresponding thereto that are utilized in the steam generating system 100 constructed in accordance with the present invention when for the latter is being operated in the $O_2$ firing mode.

Preheating the Fluidizing Air or $O_2$ Gas

Continuing with the description thereof, in the steam generating system 200 constructed in accordance with the present invention, the flue gas denoted in the drawings by the reference numeral 204 that is exhausted from the circulating fluidized bed (CFB) boiler 210 is made to flow to a separator 218, which in accordance with the present invention is designed to be substantially identical to the separator 118 that is employed in the steam generating system 100 constructed in accordance with the present invention. To this end, the separator 218 is designed to be operative to effect the exhausting therefrom of the flue gas denoted in the drawings by the reference numeral 206 that has been separated therein. The separated flue gas 206 is then subjected to cooling in the backpass 222. After being subjected to such cooling the flue gas denoted in the drawings by the reference numeral 250 is made to flow to the preheater 244. Because of the increase in the amount of fossil fuel that is injected into the circulating fluidized bed (CFB) boiler 210 when the steam generating system 200 constructed in accordance with the present invention is being operated in the $O_2$ firing mode, the amount of $O_2$, which is supplied from the oxygen source 240 to the circulating fluidized bed (CFB) boiler 210 preferably will also be increased by an amount of 25% over the amount of $O_2$ that is supplied from the oxygen source 140 to the circulating fluidized bed (CFB) boiler 110 when the steam generating system 100 constructed in accordance with the present invention is being operated in the $O_2$ firing mode, assuming that the steam generating system 200 of the present invention and the steam generating system 100 of the present invention are both generating about the same amount of net power when they are each being operated in the air fired mode. It will be readily understood by those skilled in the art that, like the oxygen source 140 that is utilized with the steam generating system 100 constructed in accordance with the present invention, the oxygen source 240, which is utilized with the steam generating system 200 constructed in accordance with the present invention, is preferably an air separation unit that is designed to be operative to effect therewith the separation of $O_2$ from an ambient air feed stream denoted in the drawings by the reference numeral 238 in order to thereby produce a stream of oxygen denoted in the drawings by the reference numeral 239 that is of a desired oxygen purity, and that can also, if desired, be configured so as to be operative to produce nitrogen ($N_2$), the latter being denoted in the drawings by the reference numeral 241.

Continuing with the description thereof, from the preheater 244 the flue gas denoted in the drawings by the reference numeral 254, which has been subjected to further cooling in the preheater 244, is made to flow to the particulate removal component 252. In accordance with the present invention the particulate removal component 252 of the steam generating system 200 of the present invention preferably is designed to be substantially identical in construction to the particulate removal component 152 that is utilized the steam generating system 100 constructed in accordance with the present invention. The flue gas denoted in the drawings by the reference numeral 258 after being subjected to particulate removal in the particulate removal component 252 is then subjected to further processing when the steam generating system 200 constructed in accordance with the present invention is being operated in the $O_2$ firing mode, rather than being made to flow directly to the blower 262 when the steam generating system 200 constructed in accordance with the present invention is being operated in the air fired mode.

Downstream Flue Gas Processing to Heat Additional Working Fluid that Drives a Turbine Continuing with the description of the present invention, the parallel feed fluid heater (PFFH) 282, which in accordance with this exemplary application of the present invention comprises preferably a parallel feedwater heater (PFWH) in the steam generating system 200 of the present invention is not needed when the steam generating system 200 constructed in accordance with the present invention is being operated in the air fired mode of operation, i.e., before conversion is had in accordance with the present invention of the steam generating system 200 of the present invention in order to enable the latter to operate in an $O_2$ firing mode. Like the PFFH 182 that is utilized in the steam generating system 100 constructed in accordance with the present invention, the PFFH 282 that is utilized in the steam generating system 200 constructed in accordance with the present invention is designed to receive the feed working fluid that is denoted in the drawings by the reference numeral 284.

Downstream Flue Gas Processing to Remove $H_2O$

After the further cooling thereof, the flue gas denoted in the drawings by the reference numeral 259 that is exhausted from the PFFH 282 is made to flow to the gas cooler 260 of the steam generating system 200 of the present invention. Thus after the cooling thereof, and the condensing and the separating of the $H_2O$ therefrom in the gas cooler 260, the flue gas 259 received by the gas cooler 260 is then exhausted therefrom as the flue gas denoted in the drawings by the reference numeral 261, which has been dewatered such as now to be formed mainly of $CO_2$. From the gas cooler 260, the dewatered flue gas 261 is made to flow to the blower 262.

The downstream flows of the flue gas denoted in the drawings by the reference numeral 264, when the steam generating system 200 constructed in accordance with the present invention is being operated in the air fired mode, and the downstream flows of the flue gas denoted in the drawings by the reference numerals 264', 264a, 264b, 264b' and 264b'', respectively, when the steam generating system 200 constructed in accordance with the present invention is being operated in the $O_2$ firing mode are substantially the same as the corresponding flows of flue gas in the steam generating system 100 constructed in accordance with the present invention. Continuing, the subsystem 266 that is utilized with the steam generating system 200 constructed in accordance with the present invention is substantially identical to the $CO_2$ compression, purification and liquefaction subsystem 166 that is utilized with the steam generating system constructed in accordance with the present invention 100.

Piping and Ducting

As will be well understood by those skilled in the art from the preceding description thereof herein, the working fluid piping (not shown in the interest of maintaining clarity of illustration in the drawings) of the steam generating system 200 constructed in accordance with the present invention may either have a correspondingly greater capacity when the steam generating system 200 of the present invention is being operated in the $O_2$ firing mode than that needed when the steam generating system 200 of the present invention is being operated in the air fired mode or the working fluid piping (not shown in the interest of maintaining clarity of illustration in the drawings) may be of the same size as when the steam generating system 200 of the present invention is being operated in the $O_2$ firing mode, but with higher pressure drops associated therewith. The air, $O_2$ gas, and flue gas ducting (not shown in the interest of maintaining clarity of illustration the drawings) of the steam generating system 200 constructed in accordance with the present invention on the other hand by virtue of having the same volume flow as that of the steam generating system 100 constructed in accordance with the present invention are preferably of the same size as those utilized with the steam generating system 100 of the present invention. In this case also, if the steam generating system 200 of the present invention and the steam generating system 100 of the present invention both generate about the same amount of net power in the air fired mode, then the working fluid piping (not shown in the interest of maintaining clarity of illustration in the drawings) of the steam generating system 200 constructed in accordance with the present invention will preferably also have a correspondingly greater capacity than does the working fluid piping (also not shown in the interest of maintaining clarity of illustration in the drawings) of the steam generating system 100 constructed in accordance with the present invention.

Additional Changes for Purposes of the Conversion to the $O_2$ Firing Mode and Related Operational Changes In the following there is described hereinafter another component that is added to the steam generating system 200 constructed in accordance with the present invention for purposes of enabling the steam generating system 200 of the present invention to be operated in the $O_2$ firing mode, but which is not required to be employed in the steam generating system 100 constructed in accordance with the present invention for purposes of enabling the steam generating system 100 of the present invention to be operated in the $O_2$ firing mode.

Recycling Solids to Heat Additional Working Fluid that Drives a Turbine

As noted previously in the discussion above, the flue gas denoted in the drawings by the reference numeral 204 that is exhausted from the circulating fluidized bed (CFB) boiler 210 is made to flow through suitable ductwork of conventional construction to a hot solids-gas separator 218, which is designed so as to be substantially identical to the separator 118 that is utilized in the steam generating system 100 constructed in accordance with the present invention. To this end, the hot solids-gas separator 218 is designed to be operative to effect therewith the separation of at least some of the hot solids from the flue gas, as has been previously described herein.

Continuing, while the heat exchanger 236 that is employed as part of the steam generating system 200 constructed in accordance with the present invention preferably is substantially identical to that of the heat exchanger 136 that is employed as part of the steam generating system 100 constructed in accordance with the present invention, in order to enable the steam generating system 200 of the present invention to be operated in the $O_2$ firing mode, another heat exchanger 237 may also be added as part of the conversion of the steam generating system 200 of the present invention to the $O_2$ firing mode, or optionally the existing heat exchanger 236 may be modified for this purpose by adding thereto more heat transfer surface. It will be recognized by those skilled in the art that if multiple separators 218 are being utilized in the steam generating system 200 of the present invention, and it is desired to add another heat exchanger 237 then typically one new heat exchanger 237 will need to be added per each separator 218.

With further reference to the present invention, when the steam generating system 200 constructed in accordance with the present invention is being operated in the $O_2$ firing mode, the hot solids after the separation thereof therein that are made to flow from the hot solids-gas separator 218 under the influence of gravity can be made to flow not only along the two recycling paths, which have been described above previously in connection with to the discussion herein of the steam generating system 100 constructed in accordance with the present invention, but may also be made to flow to a third recycling path, although there are other such possible alternatives that could equally be employed without departing from the essence of the present invention. To this end, the hot solids that are separated in the hot solids-gas separator 218 may be made to flow from the hot solids-gas separator 218 to one, two or all three of the available recycling paths without departing from the essence of the present invention. Continuing, irrespective of the number of recycling paths that the hot solids are made to flow along, after the separation thereof the hot solids denoted in the drawings by the reference numeral 212 are caused to be reintroduced into the lower segment of the circulating fluidized bed (CFB) boiler 210, and as such are then once again subjected to the combustion process that takes place in the circulating fluidized bed (CFB) boiler 210.

More specifically, after the separation thereof in the hot solids-gas separator 218 the separated solids 212 are made to flow from a lower segment of the combined hot solids-gas separator 218. From there, portions of the separated hot solids denoted in the drawings by the reference numeral 212*a* and 212*b*, respectively, are made to flow along recycle paths that are substantially similar to those along which after the separation thereof in the separator 118 portions of the separated hot solids denoted in the drawings by the reference numeral 112*a* and 112*b*, respectively, are made to flow, as has previously been described hereinbefore in connection with the discussion pertaining to the steam generating system 100 constructed in accordance with the present invention. However, in the steam generating system 200 in accordance with the present invention, another portion of the hot solids denoted in the drawings 212 after being subjected to separation in the hot solids-gas separator 218 can also be made to flow to the new heat exchanger 237 in order to thereby generate therefrom additional heated working fluid, the latter being denoted in the drawings by the reference numeral 292, which in accordance with this mode of operation may be in the form of superheated steam. When the heat exchanger 237 is so employed, the heat exchanger 237 functions as a separate parallel steam generator, i.e., the heat exchanger 237 is operative to provide a heated working fluid circuit that is designed to be in parallel with the heated working fluid circuit that is provided by the circulating fluidized bed (CFB) boiler 210 of the steam generating system 200 constructed in accordance with the present invention, when the steam generating system 200 of the present invention is being operated in the $O_2$ firing mode.

Continuing herein with description of the present invention, preferably one or more ash control valves (not shown in the interest of maintaining clarity of illustration in the drawings) are employed for purposes of effecting therewith control of the flow of the hot solids that have been separated in the hot solids-gas separator 218 between the three paths. To this end, one of these recycle paths provides a direct connection, and another or a second one of these recycle paths provides an indirect connection via the heat exchanger 236 to the lower segment of the circulating fluidized bed (CFB) boiler 210 of the steam generating system 200 constructed in accordance with the present invention. These components and the flows along these paths have been previously described in detail above in connection with the description hereinbefore of the steam generating system 100 constructed in accordance with the present invention.

Accordingly, attention will now be directed to the new or third path, which is another indirect path back to the lower segment of the circulating fluidized bed (CFB) boiler 210 via the new heat exchanger 237. To this end, the portion of the hot solids denoted in the drawings by the reference numeral 212*d*, which have been separated in the hot solids-gas separator 218 and are made to flow along said new or third path, is made to flow to the heat exchanger 237, which preferably in accordance with the present invention is depicted as being another fluidized bed heat exchanger (FBHE). The hot solids 212*d* after the separation thereof are subjected to cooling by a working fluid, which in accordance with this embodiment of the present invention preferably comprises either water, or a water-steam mixture, or steam, that is made to flow through tubes that are suitably disposed within the heat exchanger 237. Preferably, in accordance with the preferred embodiment of the present invention the working fluid that flows through the heat exchanger 237 is feedwater that is supplied from the final feedwater heater (not shown in the interest of maintaining clarity of illustration in the drawings) that comprises a part of the steam generating system 200 of the present invention.

Continuing with the description thereof, heat from the hot solids 212*d* is transferred to the working fluid that flows through the tubes of the heat exchanger 237 in order to thereby generate therefrom the heated working fluid denoted in the drawings by the reference numeral 292. By virtue of controlling the flow of the separated hot solids 212*d* along the third path through the use of any conventional means, the temperature within the heat exchanger 237 can thereby be suitably controlled. In turn this enables the temperature of the working fluid 292 to be controlled as the working fluid 292 leaves the heat exchanger 237.

In addition, by virtue of effecting control over the flow of hot solids along all of the recycle paths, the temperature in the circulating fluidized bed (CFB) boiler 210 of the steam generating system 200 constructed in accordance with the present invention can thus also be controlled. To this end, by virtue of the flow being controlled and by virtue of the recirculated solids 212 exiting from the hot solids-gas separator 218 being split between all three of the recycle paths, such that a non-cooled stream of solids denoted in the drawings by the reference numeral 212a and/or one or more streams of the solids denoted in the drawings by the reference numerals 212c and 212e, respectively, that are cooled by virtue of there being made to flow through the heat exchanger 236 and the heat exchanger 237, respectively, are returned to the circulating fluidized bed (CFB) boiler 210, aids in effecting control over the temperature in the circulating fluidized bed (CFB) boiler 210 of the steam generating system 200 constructed in accordance with the present invention.

When the steam generating system 200 constructed in accordance with the present invention is being operated in an air fired mode, the fluidizing blower 276, which is substantially similar in construction and mode of operation to the fluidizing blower 176 that is employed in the steam generating system 100 constructed in accordance with the present invention, is designed to be operative to provide fluidizing air denoted in the drawings by the reference numeral 277 to the heat exchanger 236. Such fluidizing air is designed to be operative to effect the transport of the separated hot and cooled solids denoted in the drawings by the reference numerals 212a and 212c, respectively, to the lower segment of the circulating fluidized bed (CFB) boiler 210.

When the steam generating system 200 constructed in accordance with the present invention is being operated in an $O_2$ firing mode, the fluidizing blower 276' is provided that is designed to be operative to cause the fluidizing recycled flue gas denoted in the drawings by the reference numeral 277' to flow to the heat exchanger 237. Such fluidizing recycled flue gas 277' is designed to be operative to effect the transport of the separated hot solids denoted in the drawings by the reference numeral 212e to the lower segment of the circulating fluidized bed (CFB) boiler 210. Continuing with the description thereof, the heated working fluid denoted in the drawings by the reference numeral 292 that is exhausted from the heat exchanger 237 is made to flow to the turbine 290.

As such, the second embodiment of the present invention that has been described hereinabove is designed to be operative to effect therewith the conversion of an air fired steam generating system to enable such steam generating system to be operated in an $O_2$ firing mode as well as to enable the capture therewith of the resulting generated $CO_2$, at less expense than is possible with means heretofore known. Such conversion in accordance with the present invention of such steam generating system from being operated in an air fired mode to being operated in an $O_2$ firing mode is capable of being accomplished such that any electrical output penalty that may be incurred thereby for $CO_2$ capture is minimized or even eliminated. To this end, after the steam generating system constructed in accordance with the present invention has been conversion for operation in an $O_2$ firing mode, approximately the same net electrical output can be obtained whether the steam generating system of the present invention is being operated either in an air fired mode or in an $O_2$ Firing mode. It should be readily understood that by employing the present invention, such conversion to an $O_2$ firing mode requires no modification to the pressure parts that are employed when the steam generating system of the present invention is being operated in an air fired mode, or to the other components that are employed when such steam generating system of the present invention is being operated in an air fired mode, except that the steam turbine/generator will need to be modified in order that the steam turbine/generator are capable of accommodating the additional flow thereto, i.e., a flow of 125%, when the steam generating system of the present invention is being operated in an $O_2$ firing mode.

While an embodiment(s) of our invention have been described, it will be appreciated that modifications thereof, some of which have been alluded to hereinabove, may still be readily made thereto by those skilled in the art without departing from the essence of the present invention. It is therefore intended by the appended claims to cover all such modifications that have been alluded to herein as well as any and all of the other modifications that may fall within the true spirit and scope of our invention.

We claim:
1. An O2 firing steam generating system comprising:
a fossil fuel combustor configured so as to be operative to (i) effect the fluidization of fossil fuel to thereby create a fluidized bed therefrom, (ii) to combust such fossil fuel for purposes of heating a first working fluid therewith and for generating a flue gas and hot solids entrained in the flue gas from such combustion of such fossil fuel, and (iii) to thereafter effect the exhausting of both such heated first working fluid and such generated flue gas;
an air preheater configured so as to be operative to receive such generated flue gas from said fossil fuel combustor;
a blower configured so as to be operative to cause both O2 and recycled flue gas to flow to said air preheater;
a turbine configured so as to be operative to be driven by such exhausted heated first working fluid;
wherein said air preheater (i) is operative to effect the transfer of heat from such received flue gas to both such O2 and recycled flue gas in order to thereby effect a preheating therewith of both such O2 and such recycled flue gas and a cooling of such received flue gas; and
wherein said fossil fuel combustor is operative to effect the fluidization of such fossil fuel with both such preheated O2 and such recycled flue gas;
a separator configured so as to be operative to effect therewith the separation of such entrained hot solids from such exhausted hot flue gas, wherein such exhausted flue gas that is received by said air preheater is such exhausted flue gas that has been subjected to separation in said separator; and
a heat exchanger configured so as to be operative to (i) receive both such separated hot solids and a second working fluid, (ii) effect the transfer of heat from such received hot solids to such received second working fluid in order to thereby effect both a cooling of such received hot solids and the heating of such second working fluid, and (iii) the exhaustion of such heated second working fluid; and
wherein said turbine is further configured so as to be operative to be driven by such exhausted heated second working fluid;
a second blower configured so as to be operative to cause recycled flue gas to flow to said heat exchanger; and
wherein such recycled flue gas is caused to flow to said heat exchanger both for purposes of effecting therewith a fluidization of and for purposes of causing such cooled solids to flow from said heat exchanger to said fossil fuel combustor;

a second heat exchanger configured so as to be operative to (i) receive other separated hot solids and a third working fluid, and (ii) effect the transfer of heat from such received other hot solids to such received third working fluid in order to thereby effect a cooling therewith of such received other hot solids and a heating of such third working fluid;

wherein said second blower is further configured so as to be operative to cause such recycled flue gas to flow to said second heat exchanger; and wherein such recycled flue gas is caused to flow to said second heat exchanger both for purposes of effecting therewith the fluidization of and for purposes of causing such other cooled solids to flow from said second heat exchanger to said fossil fuel combustor.

2. The O2 firing steam generating system as claimed in claim 1, wherein said blower is a first blower, the combustion of such fossil fuel also is operative to generate residual hot solids that become entrained in such exhausted hot flue gas, and said O2 firing steam generating system further comprises:

a separator configured so as to be operative to effect the separation therewith of such entrained hot solids from such exhausted hot flue gas, wherein such exhausted flue gas that is received by said air preheater is such exhausted flue gas that has been subjected to separation in said separator;

a heat exchanger configured so as to be operative to receive such separated hot solids and to effect a transfer of heat from such hot solids received thereby to a second working fluid in order to thereby effect a cooling therewith of such received hot solids;

a second blower configured so as to be operative to cause such recycled flue gas to flow to said heat exchanger; and wherein such recycled flue gas that is caused to flow to said heat exchanger is operative both to effect the fluidization of and to cause such cooled solids to flow from said heat exchanger to said fossil fuel combustor.

3. The O2 firing steam generating system as claimed in claim 1 further comprising:

a working fluid heater configured so as to be operative to (i) receive such cooled flue gas and a second working fluid, (ii) effect the transfer of heat from such received flue gas to such received second working fluid in order to thereby effect the heating therewith of such received second working fluid and the further cooling of such received flue gas, and (iii) the exhausting of such heated second working fluid; and wherein said turbine is further configured so as to be operative to be driven by such exhausted heated second working fluid.

4. A steam generating system capable of being operated in either an air fired mode or in an $O_2$ firing mode comprising:

a fossil fuel combustor configured so as to be operative to (i) effect the fluidization of fossil fuel to thereby create a fluidized bed therefrom, (ii) to combust the fossil fuel for purposes of heating a first working fluid therewith and for generating a hot flue gas and hot solids entrained in the hot flue gas from such combustion of the fossil fuel, and (iii) to thereafter effect the exhausting of both such heated first working fluid and such generated hot flue gas;

an air preheater configured so as to be operative to receive such generated hot flue gas from said fossil fuel combustor;

a first blower configured so as to be operative to (i) cause air to flow to said air preheater when said steam generating system is being operated in the air fired mode and (ii) to cause both O2 and recycled flue gas to flow to said air preheater when said steam generating system is being operated in the O2 firing mode;

wherein, when said steam generating system is being operated in the air fired mode, said air preheater is operative to effect the transfer of heat from the flue gas received thereby to the air that is caused to flow to said air preheater in order to thereby effect the preheating of such air and to effect a cooling of such flue gas therewith, and with such preheated air thereafter being made to flow from said air preheater to said fossil fuel combustor in order to thereby effect the fluidization of the fossil fuel therewith; and wherein, when said steam generating system is being operated in the O2 firing mode, said air preheater is operative to effect the transfer of heat from the flue gas received thereby to the O2 and the recycled flue gas that are both caused to flow to said air preheater in order to thereby effect a preheating of both such O2 and such recycled flue gas therewith and to effect a cooling of such flue gas therewith, and with both such preheated O2 and recycled flue gas thereafter being made to flow from said air preheater to said fossil fuel combustor in order to thereby effect the fluidization of the fossil fuel therewith;

a separator configured so as to be operative to effect the separation therewith of such entrained hot solids from such exhausted flue gas, wherein such exhausted flue gas that is received by said air preheater from the separator, is such exhausted flue gas that has been subjected to separation in said separator;

a heat exchanger configured, when said steam generating system is being operated in the O2 firing mode, so as to be operative to (i) receive both such hot solids and a second working fluid, (ii) effect a transfer of heat from such hot solids received thereby to such second working fluid received thereby in order to thereby effect a cooling therewith of such the hot solids and in order to thereby effect a heating of such second working fluid, and (iii) effect the exhausting of such heated first working fluid;

a second blower configured so as to be operative to cause such recycled flue gas to flow to said heat exchanger when said steam generating system is being operated in the O2 firing mode;

wherein, when said steam generating system is being operated in the O2 firing mode, such recycled flue gas is caused to flow to said heat exchanger for purposes of thereby both fluidizing and causing such cooled solids to flow from said heat exchanger to said fossil fuel combustor;

a second heat exchanger configured so as to be operative to receive such separated hot solids and to effect the transfer of heat from such hot solids received thereby in order to thereby effect the cooling of such received hot solids;

wherein, when said steam generating system is being operated in the air fired mode, said second blower is not employed; and wherein, when said steam generating system is being operated in the O2 firing mode, said second blower is further configured so as to be operative to cause such recycled flue gas to flow to said second heat exchanger in order thereby both to effect a fluidization therewith and to cause such cooled solids to flow from said second heat exchanger to said fossil fuel combustor.

5. The steam generating system as claimed in claim 4, wherein the second blower is configured so as to be operative to (i) cause air to flow to said heat exchanger so as to effect the fluidization of and to cause such cooled solids to flow from said heat exchanger to said fossil fuel combustor, when said steam generating system is being operated in the air fired mode and (ii) cause such recycled flue gas to flow to said heat exchanger so as to effect the fluidization of and to cause such cooled solids to flow from said heat exchanger to said fossil fuel combustor, when said steam system is being operated in the O2 firing mode.

6. The steam generating system as claimed in claim 4, further comprising:

a working fluid heater configured, when said steam generating system is being operated in the O2 firing mode, so as to be operative to (i) receive such cooled flue gas and a second working fluid, (ii) effect the transfer therewith of heat from both such flue gas received thereby to such second working fluid received thereby in order to thereby effect a heating of such second working fluid and to effect a cooling therewith of such flue gas, and (iii) effect the exhausting therefrom of such heated second working fluid; and a turbine configured so as to be operative to be driven by such heated first working fluid that is exhausted from said fossil fuel combustor and by such heated second working fluid that is exhausted from said working fluid heater.

7. The steam generating system as claimed in claim 4, further comprising:

a turbine configured so as to be operative to be driven by such heated first working fluid that is exhausted from said fossil fuel combustor and by such heated second working fluid that is exhausted from said heat exchanger.

8. A method of generating steam either in an air fired mode or an O2 firing mode comprising the steps of:

effecting the fluidization of fossil fuel to create a fluidized bed therefrom;

effecting the combustion of such fossil fuel in order to effect both the heating therewith of a first working fluid and the generation of flue gas;

effecting the transfer of heat from such generated flue gas (i) to air in order to thereby effect both a preheating of such air and a cooling of such generated flue gas, when operating in the air fired mode, or (ii) to both O2 and recycled flue gas in order to thereby effect a preheating of both such O2 and such recycled flue gas and a cooling of such generated flue gas, when operating in the O2 firing mode; and effecting a fluidization of such fossil fuel with (i) such preheated air, when operating in the air fired mode, or (ii) with both such preheated O2 and such recycled flue gas, when operating in the O2 firing mode; and effecting the transfer of heat from other separated hot solids to a third working fluid in order to thereby effect the cooling therewith of such other separated hot solids;

effecting the cooling of such cooled other solids with (i) air, when operating in the air fired mode, or (ii) recycled flue gas, when operating in the O2 firing mode; and effecting the combustion of such fluidized other solids in order to thereby effect therewith both the heating of such first working fluid and the generation of flue gas.

9. The method as claimed in 8, wherein such working fluid is a first working fluid, the combusting of such fossil fuel also generates residual hot solids that become entrained in such generated flue gas, and said method further comprises the steps of:

effecting the separation of such entrained hot solids from such generated flue gas, wherein such generated flue gas that effects the transfer of such heat therefrom comprises separated flue gas;

effecting the transfer of heat from such separated hot solids to a second working fluid in order to thereby effect a cooling therewith of such separated hot solids;

effecting the fluidization of such cooled solids with air, when operating in the air fired mode, or with recycled flue gas, when operating in the O2 firing mode; and effecting the combustion of such fluidized cooled solids in order to thereby both heat such first working fluid and generate such flue gas.

10. The method as claimed in claim 8, wherein such working fluid is a first working fluid, and said method further comprises the steps of:

effecting the transfer of heat from such cooled flue gas to a second working fluid in order to thereby effect the heating of such second working fluid and the further cooling of such cooled flue gas, when operating in the O2 firing mode; and effecting the driving of a turbine with both such heated first working fluid and such heated second working fluid.

11. The method as claimed in claim 8, wherein such working fluid is a first working fluid, the combusting of such fossil fuel also generates residual hot solids that become entrained in such generated flue gas, and said method further comprises the steps of:

effecting the separation of such entrained hot solids from such generated flue gas;

effecting the transfer of heat from such separated hot solids to a second working fluid in order to thereby effect both the cooling of such separated hot solids and the heating of such second working fluid, when operating in the O2 firing mode; and effecting the driving of a turbine with both such heated first working fluid and such heated second working fluid.

12. The method as claimed in claim 11 further comprising the steps of:

effecting the fluidization of such cooled solids with such recycled flue gas; and effecting the combustion of such fluidized cooled solids in order to thereby effect therewith both the heating of such first working fluid and the generation of flue gas.

* * * * *